US011864507B2

(12) United States Patent
Aoki et al.

(10) Patent No.: US 11,864,507 B2
(45) Date of Patent: Jan. 9, 2024

(54) CULTIVATION METHOD, INFORMATION PROCESSING APPARATUS, AND CONTROL APPARATUS

(71) Applicants: Kaoru Aoki, Shizuoka (JP); Nahoko Sato, Kanagawa (JP)

(72) Inventors: Kaoru Aoki, Shizuoka (JP); Nahoko Sato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 167 days.

(21) Appl. No.: 17/363,022

(22) Filed: Jun. 30, 2021

(65) Prior Publication Data

US 2022/0000039 A1 Jan. 6, 2022

(30) Foreign Application Priority Data

Jul. 3, 2020 (JP) ................................ 2020-115733
Oct. 19, 2020 (JP) ................................ 2020-175548

(51) Int. Cl.
*A01G 7/04* (2006.01)
*A01G 22/15* (2018.01)
*A01G 31/00* (2018.01)
*H05B 45/20* (2020.01)
*A01G 22/05* (2018.01)

(52) U.S. Cl.
CPC ............. *A01G 7/045* (2013.01); *A01G 22/05* (2018.02); *A01G 31/00* (2013.01); *H05B 45/20* (2020.01)

(58) Field of Classification Search
CPC ......... A01G 7/045; A01G 22/15; A01G 31/00
See application file for complete search history.

(56) References Cited

U.S. PATENT DOCUMENTS

| 4,216,618 | A | * | 8/1980 | Haub | ................... A01G 31/045 47/65 |
| 6,442,486 | B1 | | 8/2002 | Satake et al. | |
| 9,226,454 | B2 | * | 1/2016 | Kim | ....................... A01G 7/045 |
| 10,172,294 | B2 | * | 1/2019 | Takeuchi | ................. A01H 3/02 |
| 10,448,579 | B2 | * | 10/2019 | Casper | ...................... F21V 9/08 |
| 10,849,279 | B2 | * | 12/2020 | Vuorinen | ............... A01G 31/00 |
| 11,553,656 | B2 | * | 1/2023 | Song | .................... A01G 27/003 |
| 2018/0146626 | A1 | | 5/2018 | Xu | |
| 2018/0213735 | A1 | * | 8/2018 | Vail | ........................ A01G 7/045 |
| 2019/0082610 | A1 | * | 3/2019 | Speer | ................... H05B 47/155 |

(Continued)

FOREIGN PATENT DOCUMENTS

| CN | 103353779 A | 10/2013 |
| CN | 104866970 A | 8/2015 |

(Continued)

OTHER PUBLICATIONS

Office Action dated Jul. 1, 2022 in Chinese Patent Application No. 202110727375.8, 9 pages.

Primary Examiner — Magdalena Topolski
Assistant Examiner — Megan J Moroney
(74) Attorney, Agent, or Firm — XSENSUS LLP

(57) ABSTRACT

A cultivation method for cultivating leaf vegetables includes preparing correspondence information associating light characteristic information indicative of a characteristic of light with which leaf vegetables are irradiated, with quantified quality information having a quantified quality of leaf vegetables; setting the light characteristic information; and irradiating the leaf vegetables with light.

15 Claims, 39 Drawing Sheets

(56) References Cited

U.S. PATENT DOCUMENTS

2019/0098843 A1* 4/2019 Rosen .................... H05B 47/10
2020/0037510 A1 2/2020 Aoki
2021/0315168 A1* 10/2021 Readick ............... A01B 79/005

FOREIGN PATENT DOCUMENTS

| JP | 10-178899 | 7/1998 |
| JP | 2003-204718 | 7/2003 |
| JP | 2015-112082 | 6/2015 |
| JP | 2015-142585 | 8/2015 |
| JP | 2018-121590 A | 8/2018 |
| JP | 2018-201497 A | 12/2018 |
| JP | 2019-154348 | 9/2019 |
| JP | 2020-018210 | 2/2020 |
| WO | 2012/141091 A1 | 10/2012 |
| WO | 2013/021675 A1 | 2/2013 |
| WO | 2017/002321 A1 | 1/2017 |

* cited by examiner

FIG. 6

| | PPFD | RED PPFD | BLUE PPFD | SEEDING PPFD OF OTHER THAN RED AND BLUE | NUMBER OF DAYS | INTEGRATED PPFD |
|---|---|---|---|---|---|---|
| EXAMPLE 1 | 150 | 84 | 12 | 54 | 8 | 104 |
| EXAMPLE 2 | 150 | 84 | 12 | 54 | 8 | 104 |
| EXAMPLE 3 | 150 | 84 | 12 | 54 | 8 | 104 |
| EXAMPLE 4 | 150 | 84 | 12 | 54 | 8 | 104 |
| EXAMPLE 5 | 150 | 84 | 12 | 54 | 8 | 104 |
| EXAMPLE 6 | 150 | 84 | 12 | 54 | 8 | 104 |
| COMPARATIVE EXAMPLE 1 | 150 | 84 | 12 | 54 | 7 | 91 |
| COMPARATIVE EXAMPLE 2 | 150 | 84 | 12 | 54 | 8 | 104 |
| COMPARATIVE EXAMPLE 3 | 150 | 84 | 12 | 54 | 8 | 104 |
| COMPARATIVE EXAMPLE 4 | 150 | 84 | 12 | 54 | 8 | 104 |
| COMPARATIVE EXAMPLE 5 | 150 | 84 | 12 | 54 | 8 | 104 |

FIG. 7

| | | CULTIVATION STAGES 1 to 3 | | | | |
|---|---|---|---|---|---|---|
| | PPFD | RED PPFD | BLUE PPFD | PPFD OF OTHER THAN RED AND BLUE | NUMBER OF DAYS | INTEGRATED PPFD |
| EXAMPLE 1 | 150- | 100-167 | 50-83 | 0 | 8 | 104-173 |
| EXAMPLE 2 | 150- | 120-200 | 30-50 | 0 | 8 | 104-173 |
| EXAMPLE 3 | 150- | 128.6-214.3 | 21.4-35.7 | 0-50 | 8 | 104-173 |
| EXAMPLE 4 | 150- | 40-65 | 70-120 | 40-65 | 8 | 104-173 |
| EXAMPLE 5 | 150- | 80-120 | 50-100 | 20-30 | 8 | 104-173 |
| EXAMPLE 6 | 150- | 84-140 | 12-90 | 18-54 | 8 | 104-173 |
| COMPARATIVE EXAMPLE 1 | 150- | 100-167 | 50-83 | 0 | 7 | 91-151 |
| COMPARATIVE EXAMPLE 2 | 150- | 50-230 | 15.7-70 | 0-30 | 8 | 104-173 |
| COMPARATIVE EXAMPLE 3 | 150- | 45-100 | 8-140 | 0-65 | 8 | 104-173 |
| COMPARATIVE EXAMPLE 4 | 150- | 65-100 | 50-105 | 0-80 | 8 | 104-173 |
| COMPARATIVE EXAMPLE 5 | 150- | 100-167 | 50-83 | 0 | 8 | 104-173 |

FIG. 8

| | NUMBER OF DAYS | CULTIVATION STAGE | RB RATIO | INTEGRATED PPFD | WEIGHT (kg) | HEIGHT (m) | DIAMETER (m) | RADIUS (m) | OCCUPANCY DENSITY (kg/m$^3$) | OCCUPANCY DENSITY PER DAY |
|---|---|---|---|---|---|---|---|---|---|---|
| EXAMPLE 1 | 32 | 4 | 2 | 518.4 | 0.24 | 0.14 | 0.18 | 0.08 | 111 | 3.46 |
| EXAMPLE 2 | 32 | 4 | 4 | 518.4 | 0.28 | 0.14 | 0.18 | 0.08 | 138 | 4.3 |
| EXAMPLE 3 | 32 | 4 | 6 | 518.4 | 0.35 | 0.16 | 0.17 | 0.08 | 144 | 4.5 |
| EXAMPLE 4 | 32 | 4 | 1 | 518.4 | 0.17 | 0.17 | 0.18 | 0.09 | 64.2 | 2.01 |
| EXAMPLE 5 | 32 | 4 | 4 | 518.4 | 0.22 | 0.21 | 0.2 | 0.1 | 48.7 | 1.52 |
| EXAMPLE 6 | 32 | 4 | 7 | 518.4 | 0.21 | 0.22 | 0.2 | 0.1 | 43.1 | 1.35 |
| COMPARATIVE EXAMPLE 1 | 28 | 4 | 2 | 453.6 | 0.12 | 0.3 | 0.28 | 0.15 | 9.4 | 0.34 |
| COMPARATIVE EXAMPLE 2 | 32 | 4 | 14.6 | 518.4 | 0.15 | 0.4 | 0.1 | 0.13 | 18.3 | 0.57 |
| COMPARATIVE EXAMPLE 3 | 32 | 4 | 0.32 | 518.4 | 0.16 | 0.24 | 0.24 | 0.12 | 21.8 | 0.68 |
| COMPARATIVE EXAMPLE 4 | 32 | 4 | 0.62 | 518.4 | 0.3 | 0.24 | 0.24 | 0.12 | 41.5 | 1.3 |
| COMPARATIVE EXAMPLE 5 | 32 | 4 | 2 | 518.4 | 0.23 | 0.24 | 0.32 | 0.14 | 19.5 | 0.61 |

FIG. 9

| | HARD-NESS | THICK-NESS | COLOR RATING | Brix | VITAMIN C | ANTIOXIDATIVE CAPACITY | SWEET-NESS | BITTER-NESS | ASTRIN-GENCY | TASTI-NESS | TIPBURN |
|---|---|---|---|---|---|---|---|---|---|---|---|
| EXAMPLE 1 | 1.02 | 1.08 | 6 | 3.1 | 8.4 | 10.6 | 2.63 | 3 | 2.8 | 3.09 | NONE |
| EXAMPLE 2 | 0.65 | 1.02 | 5 | 3.3 | 8.5 | 8.2 | 2.78 | 3 | 2.86 | 3.19 | NONE |
| EXAMPLE 3 | 0.61 | 0.87 | 4.5 | 3.2 | 8.4 | 7.9 | 2.85 | 3 | 2.89 | 3.23 | NONE |
| EXAMPLE 4 | 0.49 | 0.84 | 4 | 2.6 | 4.1 | 6.4 | 2.75 | 2 | 3 | 3.47 | NONE |
| EXAMPLE 5 | 0.44 | 0.73 | 3 | 2.3 | 4.1 | 4.6 | 3.05 | 2 | 3.22 | 3.61 | NONE |
| EXAMPLE 6 | 0.41 | 0.63 | 3 | 2.8 | 4.1 | 5.6 | 3.31 | 2 | 3.31 | 3.63 | NONE |
| COMPARATIVE EXAMPLE 1 | 0.22 | 0.24 | 2 | 1.3 | 5.6 | 2.4 | 2.5 | 2.6 | 3 | 2 | NONE |
| COMPARATIVE EXAMPLE 2 | 0.22 | 0.24 | 2 | 1.3 | 5.6 | 2.4 | 2.5 | 2.6 | 3 | 2 | NONE |
| COMPARATIVE EXAMPLE 3 | 0.41 | 0.34 | 3 | 2.3 | 8.4 | 4.6 | 3 | 3 | 3 | 3 | NONE |
| COMPARATIVE EXAMPLE 4 | 0.41 | 0.34 | 2 | 1 | 4.1 | 1.8 | 4 | 3 | 3 | 3 | GENERATED |
| COMPARATIVE EXAMPLE 5 | 0.41 | 0.34 | 6 | 2.5 | 8.4 | 4.6 | 3 | 3 | 3 | 3 | GENERATED |

FIG. 10

| | PPFD | SEEDING | | | | |
|---|---|---|---|---|---|---|
| | | RED PPFD | BLUE PPFD | PPFD OF OTHER THAN RED AND BLUE | NUMBER OF DAYS | INTEGRATED PPFD |
| EXAMPLE 7 | 150 | 84 | 12 | 54 | 9 | 117 |
| EXAMPLE 8 | 150 | 84 | 12 | 54 | 9 | 117 |
| EXAMPLE 9 | 150 | 84 | 12 | 54 | 9 | 117 |
| EXAMPLE 10 | 150 | 84 | 12 | 54 | 9 | 117 |
| EXAMPLE 11 | 150 | 84 | 12 | 54 | 9 | 117 |
| EXAMPLE 12 | 150 | 84 | 12 | 54 | 9 | 117 |
| EXAMPLE 13 | 150 | 84 | 12 | 54 | 9 | 117 |
| EXAMPLE 14 | 150 | 84 | 12 | 54 | 9 | 117 |
| EXAMPLE 15 | 150 | 84 | 12 | 54 | 9 | 117 |
| COMPARATIVE EXAMPLE 6 | 150 | 84 | 12 | 54 | 9 | 117 |

FIG. 11

| | CULTIVATION STAGE 1 | | | | | | |
|---|---|---|---|---|---|---|---|
| | PPFD | RED PPFD | BLUE PPFD | PPFD OF OTHER THAN RED AND BLUE | NUMBER OF DAYS | PLANT INTERVAL | INTEGRATED PPFD |
| EXAMPLE 7 | 150 | 120 | 30 | 0 | 9 | 80 | 117 |
| EXAMPLE 8 | 150 | 120 | 30 | 0 | 9 | 80 | 117 |
| EXAMPLE 9 | 150 | 120 | 30 | 0 | 9 | 80 | 117 |
| EXAMPLE 10 | 150 | 120 | 30 | 0 | 9 | 80 | 117 |
| EXAMPLE 11 | 150 | 120 | 30 | 0 | 9 | 80 | 117 |
| EXAMPLE 12 | 150 | 120 | 30 | 0 | 9 | 80 | 117 |
| EXAMPLE 13 | 150 | 120 | 30 | 0 | 9 | 80 | 117 |
| EXAMPLE 14 | 150 | 120 | 30 | 0 | 9 | 80 | 117 |
| EXAMPLE 15 | 150 | 120 | 30 | 0 | 9 | 80 | 117 |
| COMPARATIVE EXAMPLE 6 | 150 | 120 | 30 | 0 | 9 | 80 | 117 |

FIG. 12

| | PPFD | CULTIVATION STAGE 2 | | | | | |
|---|---|---|---|---|---|---|---|
| | | RED PPFD | BLUE PPFD | PPFD OF OTHER THAN RED AND BLUE | NUMBER OF DAYS | PLANT INTERVAL | INTEGRATED PPFD |
| EXAMPLE 7 | 200 | 160 | 40 | 0 | 9 | 150 | 156 |
| EXAMPLE 8 | 200 | 160 | 40 | 0 | 9 | 150 | 156 |
| EXAMPLE 9 | 200 | 160 | 40 | 0 | 9 | 150 | 156 |
| EXAMPLE 10 | 200 | 160 | 40 | 0 | 9 | 150 | 156 |
| EXAMPLE 11 | 200 | 160 | 40 | 0 | 9 | 150 | 156 |
| EXAMPLE 12 | 200 | 160 | 40 | 0 | 9 | 150 | 156 |
| EXAMPLE 13 | 200 | 160 | 40 | 0 | 9 | 150 | 156 |
| EXAMPLE 14 | 200 | 160 | 40 | 0 | 9 | 150 | 156 |
| EXAMPLE 15 | 200 | 160 | 40 | 0 | 9 | 150 | 156 |
| COMPARATIVE EXAMPLE 6 | 200 | 160 | 40 | 0 | 9 | 150 | 156 |

FIG. 13

| | CULTIVATION STAGE 3 | | | | | |
|---|---|---|---|---|---|---|
| | PPFD | RED PPFD | BLUE PPFD | PPFD OF OTHER THAN RED AND BLUE | NUMBER OF DAYS | PLANT INTERVAL | INTEGRATED PPFD |
| EXAMPLE 7 | 200 | 160 | 40 | 0 | 8 | 170 | 138 |
| EXAMPLE 8 | 200 | 160 | 40 | 0 | 13 | 170 | 225 |
| EXAMPLE 9 | 200 | 160 | 40 | 0 | 15 | 170 | 259 |
| EXAMPLE 10 | 250 | 200 | 50 | 0 | 6 | 170 | 130 |
| EXAMPLE 11 | 250 | 200 | 50 | 0 | 9 | 170 | 194 |
| EXAMPLE 12 | 250 | 200 | 50 | 0 | 13 | 170 | 281 |
| EXAMPLE 13 | 300 | 240 | 60 | 0 | 6 | 170 | 156 |
| EXAMPLE 14 | 300 | 240 | 60 | 0 | 8 | 170 | 207 |
| EXAMPLE 15 | 300 | 240 | 60 | 0 | 10 | 170 | 259 |
| COMPARATIVE EXAMPLE 6 | 200 | 160 | 40 | 0 | 6 | 170 | 104 |

FIG. 14

| | NUMBER OF DAYS | CULTIVA-TION STAGE | RB RATIO | INTEG-RATED PPFD | WEIGHT (kg) | HEIGHT (m) | DIAMETER (m) | RADIUS (m) | OCCU-PANCY DENSITY (kg/m³) | OCCU-PANCY DENSITY PER DAY |
|---|---|---|---|---|---|---|---|---|---|---|
| EXAMPLE 7 | 35 | 4 | 4 | 527 | 0.18 | 0.11 | 0.21 | 0.08 | 85.8 | 2.45 |
| EXAMPLE 8 | 40 | 4 | 4 | 613 | 0.32 | 0.16 | 0.22 | 0.10 | 89.7 | 2.24 |
| EXAMPLE 9 | 42 | 4 | 4 | 648 | 0.36 | 0.17 | 0.23 | 0.10 | 88.6 | 2.11 |
| EXAMPLE 10 | 33 | 4 | 4 | 518 | 0.16 | 0.11 | 0.20 | 0.08 | 81.1 | 2.46 |
| EXAMPLE 11 | 36 | 4 | 4 | 583 | 0.23 | 0.13 | 0.22 | 0.09 | 83.4 | 2.32 |
| EXAMPLE 12 | 40 | 4 | 4 | 670 | 0.44 | 0.17 | 0.24 | 0.10 | 96.7 | 2.42 |
| EXAMPLE 13 | 33 | 4 | 4 | 544 | 0.17 | 0.12 | 0.21 | 0.08 | 70.3 | 2.13 |
| EXAMPLE 14 | 35 | 4 | 4 | 596 | 0.25 | 0.15 | 0.22 | 0.09 | 76.1 | 2.17 |
| EXAMPLE 15 | 37 | 4 | 4 | 648 | 0.34 | 0.16 | 0.23 | 0.10 | 86.8 | 2.35 |
| COMPARATIVE EXAMPLE 6 | 33 | 4 | 4 | 492 | 0.12 | 0.08 | 0.17 | 0.06 | 117.4 | 3.56 |

FIG. 15

| | HARDNESS | THICKNESS | COLOR RATING | Brix | VITAMIN C | ANTIOXIDATIVE CAPACITY |
|---|---|---|---|---|---|---|
| EXAMPLE 7 | 0.52 | 0.39 | 4 | 3.2 | 9.9 | 6.3 |
| EXAMPLE 8 | 0.55 | 0.4 | 5 | 3.5 | 10.8 | 7.2 |
| EXAMPLE 9 | 0.57 | 0.4 | 5 | 3.0 | 8.3 | 6.1 |
| EXAMPLE 10 | 0.56 | 0.46 | 4 | 3.6 | 11.0 | 6.9 |
| EXAMPLE 11 | 0.61 | 0.42 | 5 | 3.0 | 12.0 | 8.8 |
| EXAMPLE 12 | 0.68 | 0.5 | 5 | 3.4 | 9.7 | 8.8 |
| EXAMPLE 13 | 0.56 | 0.52 | 5 | 3.6 | 13.2 | 8.1 |
| EXAMPLE 14 | 0.65 | 0.47 | 4 | 3.8 | 13.3 | 8.9 |
| EXAMPLE 15 | 0.67 | 0.54 | 4 | 3.6 | 12.5 | 7.5 |
| COMPARATIVE EXAMPLE 6 | 0.38 | 0.2 | 3 | 2.3 | 6.0 | 4 |

FIG. 16

| | PPFD | RED PPFD | BLUE PPFD | SEEDING PPFD OF OTHER THAN RED AND BLUE | NUMBER OF DAYS | INTEGRATED PPFD |
|---|---|---|---|---|---|---|
| EXAMPLE 16 | 150 | 84 | 12 | 54 | 9 | 117 |
| EXAMPLE 17 | 150 | 84 | 12 | 54 | 9 | 117 |
| EXAMPLE 18 | 150 | 84 | 12 | 54 | 9 | 117 |
| EXAMPLE 19 | 150 | 84 | 12 | 54 | 9 | 117 |
| EXAMPLE 20 | 150 | 84 | 12 | 54 | 9 | 117 |
| EXAMPLE 21 | 150 | 84 | 12 | 54 | 9 | 117 |
| EXAMPLE 22 | 150 | 84 | 12 | 54 | 9 | 117 |
| EXAMPLE 23 | 150 | 84 | 12 | 54 | 9 | 117 |
| EXAMPLE 24 | 150 | 84 | 12 | 54 | 9 | 117 |
| COMPARATIVE EXAMPLE 7 | 150 | 84 | 12 | 54 | 9 | 117 |

FIG. 17

| | RED PPFD | BLUE PPFD | CULTIVATION STAGE 1 ||| INTEGRATED PPFD |
| | | | PPFD OF OTHER THAN RED AND BLUE | NUMBER OF DAYS | PLANT INTERVAL | |
|---|---|---|---|---|---|---|
| EXAMPLE 16 | 74 | 18 | 58 | 9 | 80 | 117 |
| EXAMPLE 17 | 74 | 18 | 58 | 9 | 80 | 117 |
| EXAMPLE 18 | 74 | 18 | 58 | 9 | 80 | 117 |
| EXAMPLE 19 | 74 | 18 | 58 | 9 | 80 | 117 |
| EXAMPLE 20 | 74 | 18 | 58 | 9 | 80 | 117 |
| EXAMPLE 21 | 74 | 18 | 58 | 9 | 80 | 117 |
| EXAMPLE 22 | 74 | 18 | 58 | 9 | 80 | 117 |
| EXAMPLE 23 | 74 | 18 | 58 | 9 | 80 | 117 |
| EXAMPLE 24 | 74 | 18 | 58 | 9 | 80 | 117 |
| COMPARATIVE EXAMPLE 7 | 74 | 18 | 58 | 9 | 80 | 117 |

FIG. 18

| | | | | CULTIVATION STAGE 2 | | | |
|---|---|---|---|---|---|---|---|
| | PPFD | RED PPFD | BLUE PPFD | PPFD OF OTHER THAN RED AND BLUE | NUMBER OF DAYS | PLANT INTERVAL | INTEGRATED PPFD |
| EXAMPLE 16 | 200 | 100 | 25 | 75 | 9 | 150 | 156 |
| EXAMPLE 17 | 200 | 100 | 25 | 75 | 9 | 150 | 156 |
| EXAMPLE 18 | 200 | 100 | 25 | 75 | 9 | 150 | 156 |
| EXAMPLE 19 | 200 | 100 | 25 | 75 | 9 | 150 | 156 |
| EXAMPLE 20 | 200 | 100 | 25 | 75 | 9 | 150 | 156 |
| EXAMPLE 21 | 200 | 100 | 25 | 75 | 9 | 150 | 156 |
| EXAMPLE 22 | 200 | 100 | 25 | 75 | 9 | 150 | 156 |
| EXAMPLE 23 | 200 | 100 | 25 | 75 | 9 | 150 | 156 |
| EXAMPLE 24 | 200 | 100 | 25 | 75 | 9 | 150 | 156 |
| COMPARATIVE EXAMPLE 7 | 200 | 100 | 25 | 75 | 9 | 150 | 156 |

FIG. 19

| | | | | CULTIVATION STAGE 3 | | | |
|---|---|---|---|---|---|---|---|
| | PPFD | RED PPFD | BLUE PPFD | PPFD OF OTHER THAN RED AND BLUE | NUMBER OF DAYS | PLANT INTERVAL | INTEGRATED PPFD |
| EXAMPLE 16 | 200 | 100 | 25 | 75 | 7 | 170 | 121 |
| EXAMPLE 17 | 200 | 100 | 25 | 75 | 9 | 170 | 156 |
| EXAMPLE 18 | 200 | 100 | 25 | 75 | 12 | 170 | 207 |
| EXAMPLE 19 | 250 | 120 | 30 | 100 | 6 | 170 | 130 |
| EXAMPLE 20 | 250 | 120 | 30 | 100 | 9 | 170 | 194 |
| EXAMPLE 21 | 250 | 120 | 30 | 100 | 13 | 170 | 281 |
| EXAMPLE 22 | 300 | 160 | 40 | 100 | 6 | 170 | 156 |
| EXAMPLE 23 | 300 | 160 | 40 | 100 | 8 | 170 | 207 |
| EXAMPLE 24 | 300 | 160 | 40 | 100 | 9 | 170 | 233 |
| COMPARATIVE EXAMPLE 7 | 200 | 100 | 25 | 75 | 6 | 170 | 104 |

FIG. 20

| | NUMBER OF DAYS | CULTIVATION STAGE | RB RATIO | INTEGRATED PPFD | WEIGHT (kg) | HEIGHT (m) | DIAMETER (m) | RADIUS (m) | OCCUPANCY DENSITY (kg/m³) | OCCUPANCY DENSITY PER DAY |
|---|---|---|---|---|---|---|---|---|---|---|
| EXAMPLE 16 | 34 | 4 | 4 | 510 | 0.18 | 0.13 | 0.23 | 0.09 | 59.0 | 1.73 |
| EXAMPLE 17 | 36 | 4 | 4 | 544 | 0.27 | 0.16 | 0.26 | 0.11 | 54.4 | 1.51 |
| EXAMPLE 18 | 39 | 4 | 4 | 596 | 0.35 | 0.18 | 0.27 | 0.11 | 60.7 | 1.56 |
| EXAMPLE 19 | 33 | 4 | 4 | 518 | 0.18 | 0.14 | 0.24 | 0.10 | 50.1 | 1.52 |
| EXAMPLE 20 | 36 | 4 | 4 | 583 | 0.29 | 0.18 | 0.25 | 0.11 | 55.8 | 1.55 |
| EXAMPLE 21 | 40 | 4 | 4 | 670 | 0.38 | 0.23 | 0.28 | 0.13 | 43.8 | 1.09 |
| EXAMPLE 22 | 33 | 4 | 4 | 544 | 0.20 | 0.15 | 0.23 | 0.09 | 58.0 | 1.76 |
| EXAMPLE 23 | 35 | 4 | 4 | 596 | 0.30 | 0.16 | 0.25 | 0.10 | 66.5 | 1.90 |
| EXAMPLE 24 | 36 | 4 | 4 | 622 | 0.38 | 0.20 | 0.27 | 0.12 | 55.2 | 1.53 |
| COMPARATIVE EXAMPLE 7 | 33 | 4 | 4 | 492 | 0.16 | 0.09 | 0.20 | 0.07 | 100.3 | 3.04 |

FIG. 21

| | HARDNESS | THICKNESS | COLOR RATING | Brix | VITAMIN C | ANTIOXIDATIVE CAPACITY |
|---|---|---|---|---|---|---|
| EXAMPLE 16 | 0.60 | 0.51 | 4 | 3.8 | 8.8 | 4.2 |
| EXAMPLE 17 | 0.68 | 0.44 | 4 | 3.6 | 9.0 | 5.6 |
| EXAMPLE 18 | 0.62 | 0.50 | 4 | 3.5 | 10.4 | 5.4 |
| EXAMPLE 19 | 0.69 | 0.60 | 4 | 4.2 | 10.5 | 7.2 |
| EXAMPLE 20 | 0.75 | 0.47 | 5 | 4.4 | 12.6 | 6.8 |
| EXAMPLE 21 | 0.75 | 0.46 | 4 | 4.2 | 11.2 | 5.2 |
| EXAMPLE 22 | 0.69 | 0.47 | 4 | 4.2 | 11.8 | 7.6 |
| EXAMPLE 23 | 0.67 | 0.46 | 4 | 4.6 | 14.8 | 6.4 |
| EXAMPLE 24 | 0.75 | 0.46 | 5 | 5.0 | 11.5 | 8.4 |
| COMPARATIVE EXAMPLE 7 | 0.45 | 0.30 | 3 | 3.2 | 6.2 | 3.2 |

FIG. 38

| WHITE LIGHT SOURCE WEIGHT CHARACTERISTIC | | | |
|---|---|---|---|
| WEIGHT | RB RATIO | RED PPFD | BLUE PPFD |
| ⋮ | ⋮ | ⋮ | ⋮ |
| 169 | 1 | ⋮ | ⋮ |

| RB LIGHT SOURCE WEIGHT CHARACTERISTIC | | | |
|---|---|---|---|
| WEIGHT | RB RATIO | RED PPFD | BLUE PPFD |
| ⋮ | ⋮ | ⋮ | ⋮ |
| 262.9 | 2 | ⋮ | ⋮ |
| ⋮ | ⋮ | ⋮ | ⋮ |
| 307.9 | 4 | ⋮ | ⋮ |
| ⋮ | ⋮ | ⋮ | ⋮ |
| 316.6 | 6 | ⋮ | ⋮ |
| ⋮ | ⋮ | ⋮ | ⋮ |

CULTIVATION METHOD, INFORMATION PROCESSING APPARATUS, AND CONTROL APPARATUS

CROSS-REFERENCE TO RELATED APPLICATIONS

This patent application is based on and claims priority pursuant to 35 U.S.C. § 119(a) to Japanese Patent Application Nos. 2020-115733, filed on Jul. 3, 2020, and 2020-175548, filed on Oct. 19, 2020, in the Japan Patent Office, the entire disclosure of which is hereby incorporated by reference herein.

BACKGROUND

Technical Field

The present disclosure relates to a cultivation method, an information processing apparatus, and a control apparatus.

Description of the Related Art

Japanese Unexamined Patent Application Publication No. 2015-142585-A discloses a plant cultivation method including a red-light irradiation step S1 of irradiating a plant with red-light illumination light and a blue-light irradiation step S2 of irradiating a plant with blue-light illumination light. In the disclosed plant cultivation method, the irradiation time of each step is set to 3 hours or more and less than 48 hours, irradiation cycles C1 and C2 including the red-light irradiation step and the blue-light irradiation step are performed at least two cycles within a certain period, and a procedure is started in any one step of the red-light irradiation step and the blue-light irradiation step in the irradiation cycles.

Japanese Unexamined Patent Application Publication No. 2015-112082-A discloses a method of cultivating leaf vegetables using artificial light in a fully controlled vegetable plant. In the disclosed cultivation method, red, green, and blue (RGB) light-emitting diode (LED) illumination and RGB LED illumination including far-infrared light are used as light sources of artificial light. After seeding of the leaf vegetables, a growth period is provided in which light using the RGB LED illumination is emitted for 5 days to 14 days, and then a growth period is provided in which light using the RGB LED illumination including far-infrared light is emitted for 7 days to 23 days.

SUMMARY

A cultivation method for cultivating leaf vegetables according to an embodiment of the present disclosure includes preparing correspondence information associating light characteristic information indicative of a characteristic of light with which leaf vegetables are irradiated, with quantified quality information having a quantified quality of leaf vegetables; setting the light characteristic information; and irradiating the leaf vegetables with light.

An information processing apparatus according to an embodiment includes circuitry that: stores, in a memory, correspondence information associating light characteristic information indicative of a characteristic of light with which leaf vegetables are irradiated, with quantified quality information having a quantified quality of leaf vegetables; receives input of the quantified quality information; and controls a display to display the light characteristic information corresponding to the received quantified quality information based on the received quantified quality information and the correspondence information.

A control apparatus according to an embodiment includes circuitry that: stores, in a memory, correspondence information associating light characteristic information indicative of a characteristic of light with which leaf vegetables are irradiated, with quantified quality information having a quantified quality of leaf vegetables; receives input of the quantified quality information; and outputs a signal to control a light source configured to irradiate the leaf vegetables with light based on the received quantified quality information and the correspondence information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a table presenting seeding in Examples 1 to 6 and Comparative Examples 1 to 5 of the cultivation method according to the present embodiment;

FIG. 7 is a table presenting cultivation stages 1 to 3 in Examples 1 to 6 and Comparative Examples 1 to 5 of the cultivation method according to the present embodiment;

FIG. 8 is a table presenting the number of days for cultivation and other items in Examples 1 to 6 and Comparative Examples 1 to 5 of the cultivation method according to the present embodiment;

FIG. 9 is a table presenting hardness and other items in Examples 1 to 6 and Comparative Examples 1 to 5 of the cultivation method according to the present embodiment;

FIG. 10 is a table presenting seeding in Examples 7 to 15 and Comparative Example 6 of the cultivation method according to the present embodiment;

FIG. 11 is a table presenting the cultivation stage 1 in Examples 7 to 15 and Comparative Example 6 of the cultivation method according to the present embodiment;

FIG. 12 is a table presenting the cultivation stage 2 in Examples 7 to 15 and Comparative Example 6 of the cultivation method according to the present embodiment;

FIG. 13 is a table presenting the cultivation stage 3 in Examples 7 to 15 and Comparative Example 6 of the cultivation method according to the present embodiment;

FIG. 14 is a table presenting the number of days for cultivation and other items in Examples 7 to 15 and Comparative Example 6 of the cultivation method according to the present embodiment;

FIG. 15 is a table presenting hardness and other items in Examples 7 to 15 and Comparative Example 6 of the cultivation method according to the present embodiment;

FIG. 16 is a table presenting seeding in Examples 16 to 24 and Comparative Example 7 of the cultivation method according to the present embodiment;

FIG. 17 is a table presenting the cultivation stage 1 in Examples 16 to 24 and Comparative Example 7 of the cultivation method according to the present embodiment;

FIG. 18 is a table presenting the cultivation stage 2 in Examples 16 to 24 and Comparative Example 7 of the cultivation method according to the present embodiment;

FIG. 19 is a table presenting the cultivation stage 3 in Examples 16 to 24 and Comparative Example 7 of the cultivation method according to the present embodiment;

FIG. 20 is a table presenting the number of days for cultivation and other items in Examples 16 to 24 and Comparative Example 7 of the cultivation method according to the present embodiment;

FIG. 21 is a table presenting hardness and other items in Examples 16 to 24 and Comparative Example 7 of the cultivation method according to the present embodiment;

FIG. 38 is a conceptual illustration presenting an example of a light source control information management table according to the present embodiment;

Figure 1:
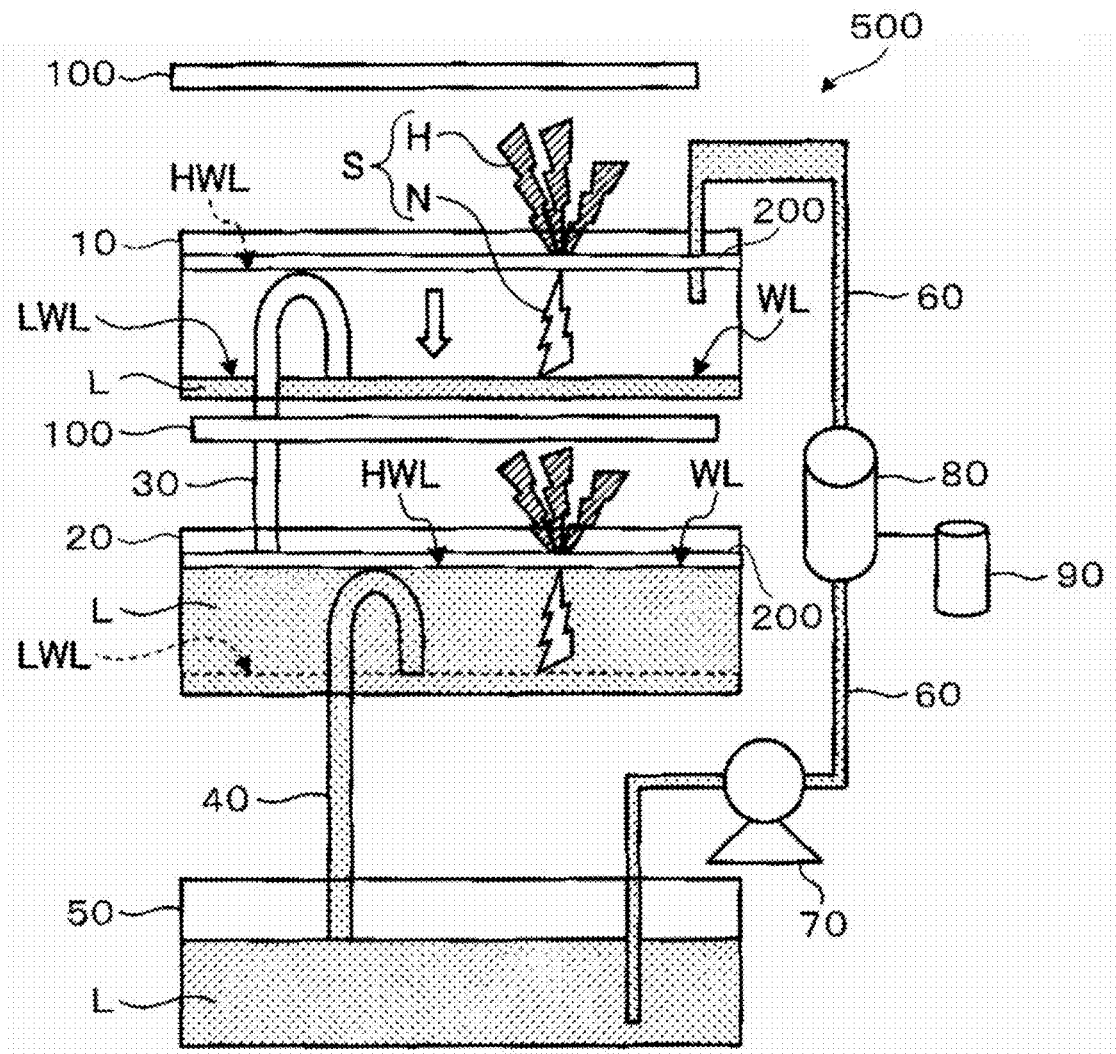
FIG. 1 is a schematic view of an example of a cultivation system to which a cultivation method according to an embodiment of the present disclosure is applied.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a schematic view of a hydroponic cultivation system 500 as an example of a cultivation system to which a cultivation method according to an embodiment of the present disclosure is applied. As illustrated in FIG. 1, the hydroponic cultivation system 500 includes a cultivation tank 10 disposed in an upper stage and a cultivation tank 20 disposed in a lower stage below the cultivation tank 10.

The cultivation tanks 10 and 20 are coupled to each other through a siphon tube 30, have the same volume, and each can store a nutrient solution L in a lower portion thereof. In the present embodiment, a liquid containing water as a main component and containing nutrients is used as the nutrient solution L. However, the nutrient solution L is not limited thereto, and may be simple water or a liquid containing water not as a main component.

An installation tray 200 is disposed in an upper portion of each of the cultivation tanks 10 and 20. The installation tray 200 serves as an installation table for plants S that are grown using the nutrient solution L. The plants S are plants having leaves H and roots N, and in the present embodiment, for example, leaf vegetables such as lettuce and Komatsuna are expected. In FIG. 1, while one plant S is installed in the installation tray 200, a plurality of plants S are actually installed.

Figure 2:
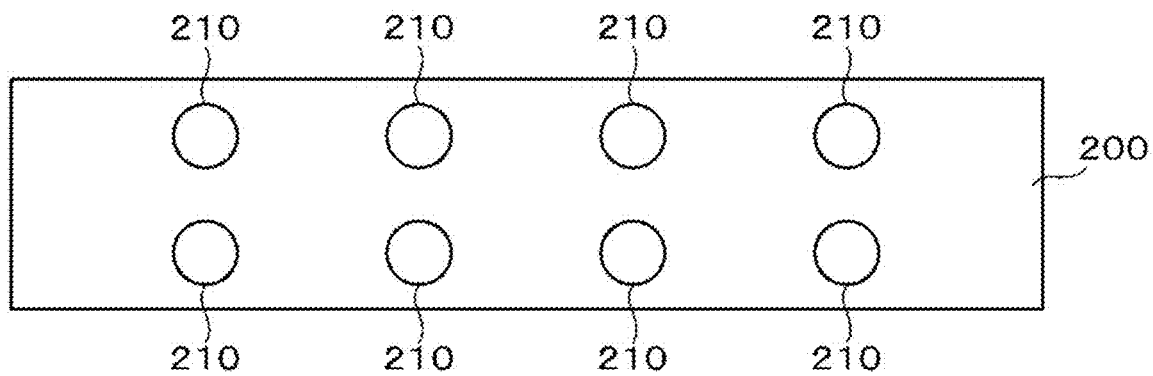
FIG. 2 is a plan view illustrating an example of an installation table provided in the cultivation system illustrated in FIG. 1.

FIG. 2 is a plan view illustrating an example of the installation tray 200 provided in the cultivation system 500 illustrated in FIG. 1. As illustrated in FIG. 2, the installation tray 200 has a hole 210 serving as an installation place of a plant S for each plant S. That is, the installation tray 200 has a plurality of holes 210 corresponding to a plurality of plants S. The plants S are installed in the cultivation tanks 10 and 20 by inserting the roots N into the holes 210. In the present embodiment, an example is illustrated in which the installation tray 200 has eight holes 210; however, the number of holes 210 is not limited thereto, and can be appropriately changed depending on the growth stage and type of the plants S, the size of the cultivation tanks 10 and 20, and so forth.

A storage tank 50 coupled to the cultivation tank 20 via a siphon tube 40 is provided at a lower stage below the cultivation tank 20, and the nutrient solution L is stored in the storage tank 50. The storage tank 50 is coupled to the cultivation tank 10 via a circulation pipe 60. A nutrient solution pump 70 and a bubble generator 80 are provided in the middle of the circulation pipe 60. When the nutrient solution pump 70 is operated, the nutrient solution L in the storage tank 50 can be supplied to the cultivation tank 10 through the circulation pipe 60.

The bubble generator 80 is provided downstream of the nutrient solution pump 70, and is supplied with gas from a gas tank 90 to generate bubbles in the nutrient solution L. Available examples of the bubble generation method include a cavitation method and a pressure dissolution method. A plant irradiation device 100 serving as an irradiation device is provided immediately above each of the cultivation tanks 10 and 20. The plant irradiation devices 100 irradiate entire upper surfaces of the cultivation tanks 10 and 20 with light.

The siphon tube 30 is a tube curved in an inverted J shape in a side view, and has an intake port and a drain port at both end portions thereof. The intake port is positioned at a lower limit level LWL of the nutrient solution L set near the bottom surface of the cultivation tank 10, for example, at the lower end of the root N. The drain port is disposed inside the cultivation tank 20. The top of the siphon tube 30 is positioned at an upper limit level HWL of the nutrient solution L set at the height of the boundary between the leaf H and the root N of the plant S.

The siphon tube 40 is disposed in the same manner as the siphon tube 30.

That is, the intake port of the siphon tube 40 is positioned at the lower limit level LWL of the nutrient solution L set near the bottom surface of the cultivation tank 20, and the drain port is disposed inside the storage tank 50. The top of the siphon tube 40 is positioned at an upper limit level HWL of the nutrient solution L set at the height of the boundary between the leaf H and the root N of the plant S.

In the hydroponic cultivation system 500, the nutrient solution pump 70 is turned on and off at a predetermined timing to alternately fill the siphon tubes 30 and 40 with the nutrient solution L, to alternately generate drainage by a siphon action, and to alternately raise and lower the levels WL of the nutrient solution L in the cultivation tanks 10 and 20. When the level WL of the nutrient solution L rises and falls between the upper limit level HWL and the lower limit level LWL in each of the cultivation tanks 10 and 20, a state in which the root N of the plant S is immersed in the nutrient solution L and a state in which the root N is exposed from the nutrient solution L are repeated. In the present embodiment, the time during which the root N of the plant S is exposed from the nutrient solution L is set to be longer than the time during which the root N is immersed in the nutrient solution L.

The above operation procedure will be described more specifically. As illustrated in FIG. 1, when the level WL of the nutrient solution L in the cultivation tank 10 reaches the lower limit level LWL, automatic drainage through the siphon tube 30 from the cultivation tank 10 to the cultivation tank 20 is stopped. In contrast, when the level WL of the nutrient solution L in the cultivation tank 20 reaches the upper limit level HWL, the siphon tube 40 is filled with the nutrient solution L, and hence automatic drainage by the siphon action is started. Thus, the nutrient solution L in the cultivation tank 20 is drained to the storage tank 50 through the siphon tube 40.

At the time when or after the automatic drainage through the siphon tube 30 is stopped, the nutrient solution pump 70 is turned on to be operated. The supply of the nutrient solution L from the storage tank 50 to the cultivation tank 10 through the circulation pipe 60 is started, and the level WL of the nutrient solution L in the cultivation tank 10 rises. Bubbles generated by the bubble generator 80, that is, microbubbles or ultrafine bubbles are mixed in the nutrient solution L. In contrast, the level WL of the nutrient solution L in the cultivation tank 20 is lowered by the automatic drainage of the siphon tube 40. When the level WL of the nutrient solution L in the cultivation tank 20 reaches the lower limit level LWL, the siphon action stops, and the automatic drainage from the cultivation tank 20 to the storage tank 50 stops.

When the level WL of the nutrient solution L in the cultivation tank 10 reaches the upper limit level HWL, the inside of the siphon tube 30 is filled with the nutrient solution L, and the automatic drainage by the siphon action is started. Thus, the nutrient solution L in the cultivation tank 10 is drained to the cultivation tank 20 through the siphon tube 30.

At the time when or after the automatic drainage by the siphon tube 30 is started, the nutrient solution pump 70 is turned off to stop the operation. Thus, the supply of the nutrient solution L from the circulation pipe 60 to the cultivation tank 10 is stopped.

Thereafter, the on and off operations of the nutrient solution pump 70 are repeated in the above-described procedure to alternately raise and lower the levels WL of the nutrient solution L in the cultivation tanks 10 and 20 between the upper limit levels HWL and the lower limit levels LWL. Although an example of the siphon cultivation method has been described above, the cultivation method of the present embodiment is not limited to the siphon cultivation method, and any general cultivation method may be used.

Figure 3:
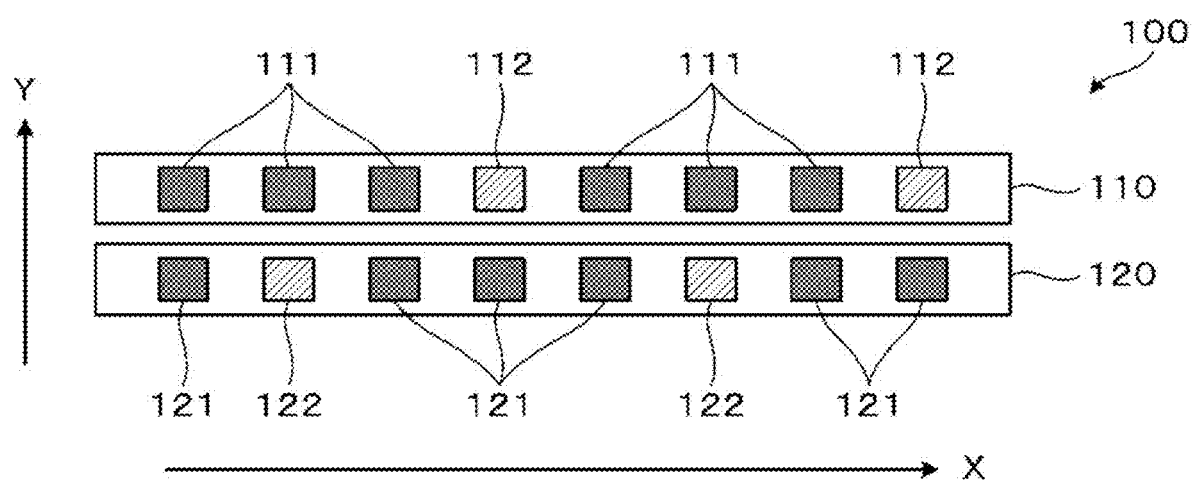
FIG. 3 is a plan view illustrating an example of an irradiation device provided in the cultivation system illustrated in FIG. 1.

FIG. 3 is a plan view illustrating an example of the plant irradiation device 100 provided in the cultivation system 500 illustrated in FIG. 1. As illustrated in FIG. 3, the plant irradiation device 100 includes a first light source array 110 extending in a predetermined direction, that is, the X direction, and a second light source array 120 provided side by side with the first light source array 110 in an intersecting direction intersecting the X direction, that is, the Y direction. The X direction and the Y direction are desirably orthogonal to each other.

The first light source array 110 includes light emitters 111 as a plurality of first light sources that emit light of a first color. The first light source array 110 includes light emitters 112 as a plurality of second light sources that emit light of a second color different from the first color. The light emitters 111 are LEDs that emit light of red as the first color. The light emitters 112 are LEDs that emit light of blue as the second color.

Figure 4:
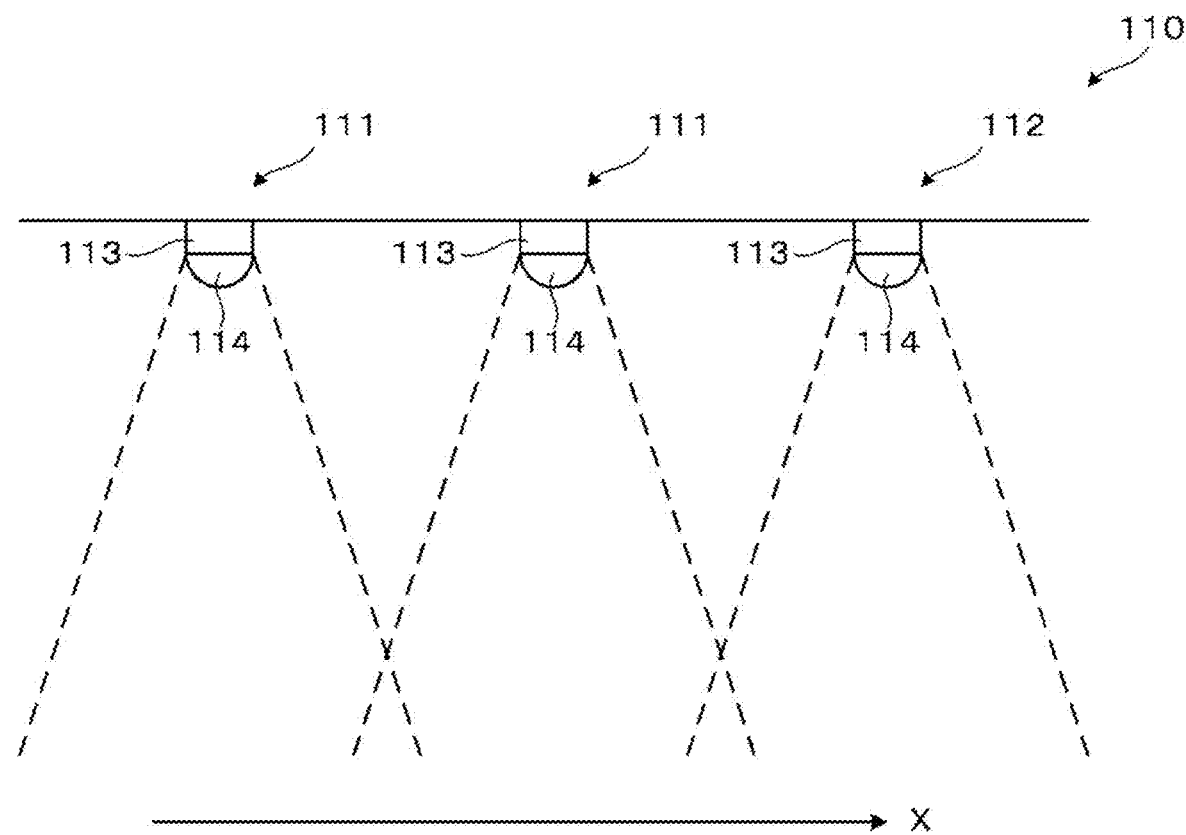
FIG. 4 is a view illustrating an example of a configuration of light sources provided in the irradiation device illustrated in FIG. 3.

FIG. 4 illustrates an example of a configuration of the light emitters 111 and 112 provided in the plant irradiation device 100 illustrated in FIG. 3. As illustrated in FIG. 4, the light emitters 111 and the light emitters 112 each are formed by covering a light-emitting surface of an LED chip 113 with a dome-shaped transparent resin 114 to widen the directivity.

A pigment called chlorophyll relates to photosynthesis of the plant S. Chlorophyll has a characteristic of absorbing light in a red wave range having a peak near 660 nm and light in a blue wave range having a peak near 450 nm. That is, the red light and the blue light are effective for the growth of the plant S, and among them, the red light has the largest effect on the photosynthesis and is particularly required for the photosynthesis of the plant S. It is known that the blue light is required to strengthen the plant S or to increase the nutrient component of the plant S. That is, the blue light is light required for photomorphogenesis of the plant S.

Since the wavelengths of general red and blue LEDs are substantially the same as the peaks of photosynthesis, general LEDs are used for the light emitters 111 and the light emitters 112.

As described above, since the red light and the blue light have respective roles, the plant S is desirably irradiated with the red light and the blue light in a well-balanced manner. The optimum ratio between the light intensities of the red light and the blue light differs depending on the type and growth stage of the plant S. From the viewpoint of healthy growth of the plant S, it is desirable to emit the red light more than the blue light.

As illustrated in FIG. 3, in this example, the number of light emitters 111 is larger than the number of light emitters 112 in the first light source array 110. In other words, the number of light emitters 112 is smaller than the number of light emitters 111. The light emitters 111 and the light emitters 112 are regularly arranged in the X direction at a ratio of 3:1 in this example.

Similarly to the first light source array 110, the second light source array 120 includes light emitters 121 as a plurality of first light sources that emit light of a first color. The second light source array 120 includes light emitters 122 as a plurality of second light sources that emit light of a second color different from the first color. The light emitters 121 are LEDs that emit light of red as the first color. The light emitters 122 are LEDs that emit light of blue as the second color. The configurations of the light emitters 121 and the light emitters 122 are similar to those of the light emitters 111 and the light emitters 112 illustrated in FIG. 4.

In the second light source array 120, the light emitters 121 and the light emitters 122 are regularly arranged in the X direction at a ratio of 3:1 in this example. As illustrated in FIG. 3, the light emitters are disposed so as to have a color arrangement shifted from the color arrangement of the light emitters in the first light source array 110.

Figure 5:
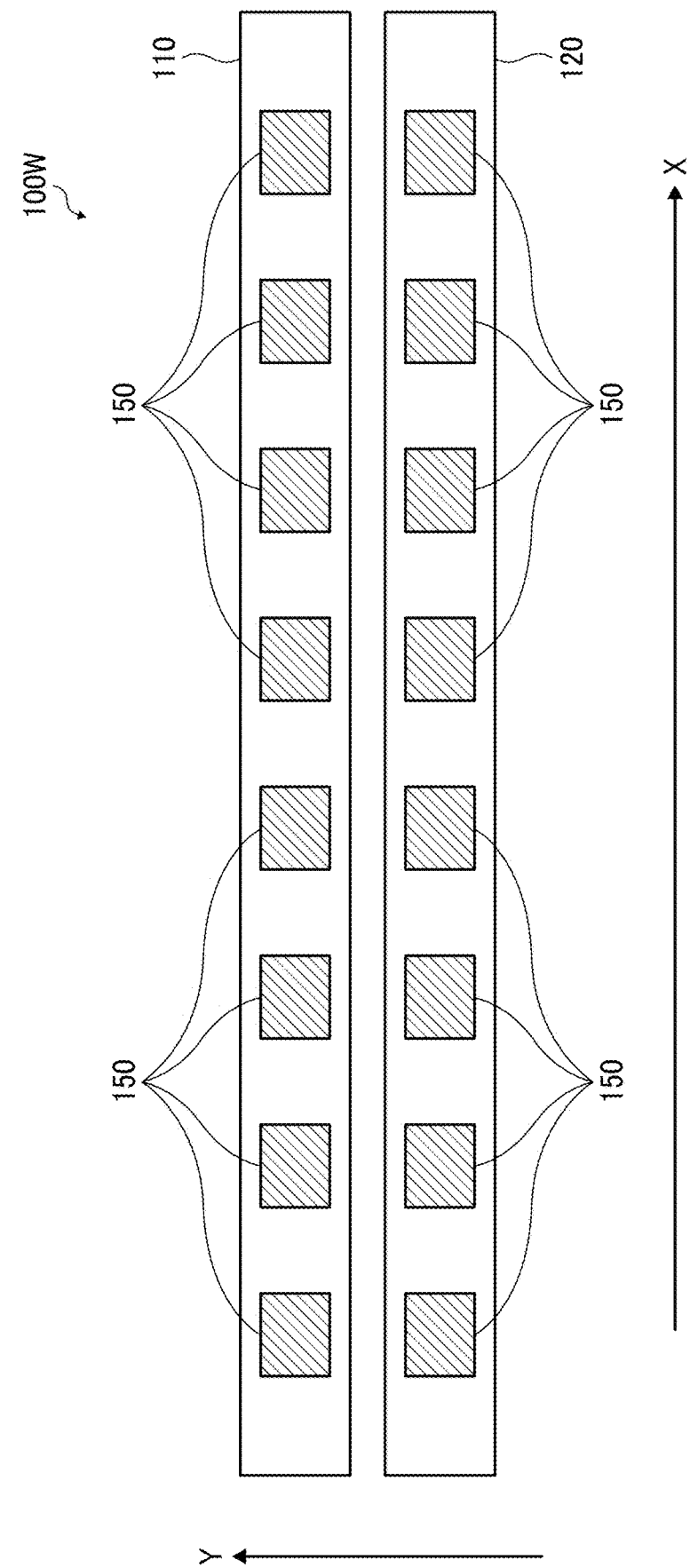
FIG. 5 is a plan view illustrating another example of the irradiation device provided in the cultivation system illustrated in FIG. 1.

FIG. 5 is a plan view illustrating another example of a plant irradiation device 100W provided in the cultivation system 500 illustrated in FIG. 1. As illustrated in FIG. 5, similarly to the plant irradiation device 100 illustrated in FIG. 3, the plant irradiation device 100W includes a first light source array 110 extending in a predetermined direction, that is, the X direction, and a second light source array 120 provided side by side with the first light source array 110 in an intersecting direction intersecting the X direction, that is, the Y direction. The X direction and the Y direction are desirably orthogonal to each other.

The first light source array 110 and the second light source array 120 include light emitters 150 as a plurality of third light sources that emit light of a third color. The light emitters 150 are LEDs that emit light of white as the third color.

Similarly to the light emitters 111 and the light emitters 112 illustrated in FIG. 4, the light emitters 150 each are formed by covering a light-emitting surface of an LED chip with a dome-shaped transparent resin to widen the directivity.

FIGS. 6 to 21 are tables presenting examples and comparative examples of the cultivation method according to the present embodiment. Weight indicates a weight per plant excluding the root. Height indicates the maximum height from a surface of a cultivation board. Diameter indicates a diameter of a plant. Occupancy density indicates a weight per 1 $m^3$. Hardness indicates a breaking strength at a distance of 30 mm from the tip of a leaf. Color rating indicates a color rank of the leaf color scale (for paddy rice). Brix indicates a measurement value of a Brix meter of an edible portion. Antioxidative capacity (antioxidant component content) indicates a measurement value measured by an absorptiometric method (1,1-diphenyl-2-picrylhydrazyl (DPPH) assay) of an edible portion. Sweetness indicates a sweetness rank (sweet: rank 5) obtained by taste sensory evaluation. Bitterness indicates a bitterness rank (bitter: rank 5) obtained by taste sensory evaluation. Astringency indicates an astringency rank (astringent: rank 5) obtained by taste sensory evaluation. The present embodiment is not limited to the quality measurement method described above.

The cultivation method of the present embodiment is performed by, for example, the cultivation system 500 illustrated in FIG. 1, is applicable to all kinds of leaf vegetables, and is in particularly effective when applied to lettuce such as leaf lettuce of Compositae. The cultivation system 500 illustrated in FIG. 1 uses a facility for cultivating leaf vegetables in a space isolated from the outside and appropriately controlled in temperature and humidity. The seedling as the plant S is produced by, for example, seeding and germination.

The plant irradiation device 100 desirably performs irradiation using an artificial light source formed of, for example, a light emitting diode, but is not limited thereto, and may use an artificial light source formed of a light emitter other than a light emitting diode, for example, an artificial light source formed of an organic electroluminescence (EL) element. The intensity of the illumination light from the plant irradiation device 100 and the type (light quality) of the illumination light may be changed within the range of the advantageous effect of the present embodiment. The illumination device of the present embodiment is not limited to the plant irradiation device 100 illustrated in any one of FIGS. 3 to 5, and may be an illumination device of another form as long as the advantageous effect of the present embodiment is exhibited.

Cultivation Examples

Example 1. In a seeding stage, white LEDs were used, and irradiation was performed for 24 hours for 8 days at a photosynthetic photon flux density of 150 μmol/m² s. In and after the cultivation stage 1, red LEDs having a wavelength range from 600 nm to 700 nm and blue LEDs having a wavelength range from 400 nm to 499 nm were used, and irradiation was performed for 24 hours for 8 days at photosynthetic photon flux densities in a range from 150 μmol/m² s to 250 μmol/m² s. As the cultivation stage progressed, an integrated photosynthetic photon flux density for each stage was increased. Cultivation was performed such that the ratio between the photosynthetic photon flux density of red light having the wavelength range from 600 nm to 700 nm and the photosynthetic photon flux density of blue light having the wavelength range from 400 nm to 499 nm was 2:1, and that the integrated photosynthetic photon flux density at the center of the seedling on the surface of the cultivation board was 518 mol/m². A cultivated object occupancy density of 110.7 kg/m³ was obtained.

Hereinafter, the photosynthetic photon flux density will be referred to as PPFD, the integrated photosynthetic photon flux density will be referred to as integrated PPFD, red light and red LEDs having the wavelength range from 600 nm to 700 nm will be simply referred to as red light and red LEDs, and blue light and blue LEDs having the wavelength range from 400 nm to 499 nm will be simply referred to as blue light and blue LEDs. Hereinafter, the ratio between the photosynthetic photon flux density of red light and the photosynthetic photon flux density of blue light is referred to as RB ratio.

Example 2. In the seeding stage, white LEDs were used, and irradiation was performed for 24 hours for 8 days at a PPFD of 150 μmol/m² s. In and after the cultivation stage 1, red LEDs and blue LEDs were used, and irradiation was performed for 24 hours for 8 days at PPFDs in a range from 150 μmol/m² s to 250 μmol/m² s. As the cultivation stage progressed, the integrated PPFD for each stage was increased. Cultivation was performed such that the RB ratio was 4:1, and that the integrated PPFD at the center of the seedling on the surface of the cultivation board was 518 mol/m². A cultivated object occupancy density of 137.6 kg/m³ was obtained.

Example 3. In the seeding stage, white LEDs were used, and irradiation was performed for 24 hours for 8 days at a PPFD of 150 μmol/m² s. In and after the cultivation stage 1, red LEDs and blue LEDs were used, and irradiation was performed for 24 hours for 8 days at PPFDs in a range from 150 μmol/m² s to 250 μmol/m² s. As the cultivation stage progressed, the integrated PPFD for each stage was increased. Cultivation was performed such that the RB ratio was 6:1, and that the integrated PPFD at the center of the seedling on the surface of the cultivation board was 518 mol/m². A cultivated object occupancy density of 144.1 kg/m³ was obtained.

Example 4. In the seeding stage, white LEDs were used, and irradiation was performed for 24 hours for 8 days at a PPFD of 150 μmol/m² s. In and after the cultivation stage 1, the white LEDs were used, and irradiation was performed for 24 hours for 8 days at PPFDs in a range from 150 μmol/m² s to 250 μmol/m² s. As the cultivation stage progressed, the integrated PPFD for each stage was increased. Cultivation was performed such that the RB ratio was 1:1, and that the integrated PPFD at the center of the seedling on the surface of the cultivation board was 518 mol/m². A cultivated object occupancy density of 64.21 kg/m³ was obtained.

Example 5. In the seeding stage, white LEDs were used, and irradiation was performed for 24 hours for 8 days at a PPFD of 150 μmol/m² s. In and after the cultivation stage 1, the white LEDs were used, and irradiation was performed for 24 hours for 8 days at PPFDs in a range from 150 μmol/m² s to 250 μmol/m² s. As the cultivation stage progressed, the integrated PPFD for each stage was increased. Cultivation was performed such that the RB ratio was 4:1, and that the integrated PPFD at the center of the seedling on the surface of the cultivation board was 518 mol/m². A cultivated object occupancy density of 48.71 kg/m³ was obtained.

Example 6. In the seeding stage, white LEDs were used, and irradiation was performed for 24 hours for 8 days at a PPFD of 150 μmol/m² s. In and after the cultivation stage 1, the white LEDs were used, and irradiation was performed for 24 hours for 8 days at PPFDs in a range from 150 μmol/m² s to 250 μmol/m² s. As the cultivation stage progressed, the integrated PPFD for each stage was increased. Cultivation was performed such that the RB ratio was 7:1, and that the integrated PPFD at the center of the seedling on the surface of the cultivation board was 518 mol/m². A cultivated object occupancy density of 43.12 kg/m³ was obtained.

Comparative Example 1. In the seeding stage, white LEDs were used, and irradiation was performed for 24 hours for 7 days at a PPFD of 150 μmol/m² s. In and after the cultivation stage 1, red LEDs and blue LEDs were used, and irradiation was performed for 24 hours for 7 days at PPFDs in a range from 150 μmol/m² s to 250 μmol/m² s. As the cultivation stage progressed, the integrated PPFD for each stage was increased. Cultivation was performed such that the RB ratio was 2:1, and that the integrated PPFD at the center of the seedling on the surface of the cultivation board was 453.6 mol/m². A cultivated object occupancy density of 9.402 kg/m³ was obtained.

Comparative Example 2. In the seeding stage, white LEDs were used, and irradiation was performed for 24 hours for 8 days at a PPFD of 150 μmol/m² s. In and after the cultivation stage 1, red LEDs and blue LEDs were used, and irradiation was performed for 24 hours for 8 days at PPFDs in a range from 150 μmol/m² s to 250 μmol/m² s while the RB ratio was 14.6:1. As the cultivation stage progressed, the integrated PPFD for each stage was increased. Cultivation was performed such that the integrated PPFD at the center of the seedling on the surface of the cultivation board was 518 mol/m². A cultivated object occupancy density of only 18.34 kg/m³ was obtained. The hardness was 0.22 N, and the thickness was 0.24 mm which were insufficient.

Comparative Example 3. In the seeding stage, white LEDs were used, and irradiation was performed for 24 hours for 8 days at a PPFD of 150 μmol/m² s. In and after the cultivation stage 1, red LEDs and blue LEDs were used, and irradiation was performed for 24 hours for 8 days at PPFDs in a range from 150 μmol/m² s to 250 μmol/m² s while the RB ratio was 0.32:1. As the cultivation stage progressed, the integrated PPFD for each stage was increased. Cultivation was performed such that the integrated PPFD at the center of the seedling on the surface of the cultivation board was 518 mol/m². A cultivated object occupancy density of only 21.84 kg/m³ was obtained.

Comparative Example 4. In the seeding stage, white LEDs were used, and irradiation was performed for 24 hours for 8 days at a PPFD of 150 µmol/m² s. In and after the cultivation stage 1, red LEDs and blue LEDs were used, and irradiation was performed for 24 hours for 8 days at PPFDs in a range from 150 µmol/m² s to 250 µmol/m² s while the RB ratio was 0.62:1. As the cultivation stage progressed, the integrated PPFD for each stage was increased. Cultivation was performed such that the integrated PPFD at the center of the seedling on the surface of the cultivation board was 518 mol/m². A cultivated object occupancy density of 41.47 kg/m³ was obtained. However, tipburn, which is a physiological disorder, was generated.

Comparative Example 5. In the seeding stage, white LEDs were used, and irradiation was performed for 24 hours for 8 days at a PPFD of 150 µmol/m² s. In and after the cultivation stage 1, red LEDs and blue LEDs were used, and irradiation was performed for 24 hours for 8 days at PPFDs in a range from 150 µmol/m² s to 250 µmol/m² s. The intervals between plants were set to 40 mm in the seeding stage, 160 mm in the cultivation stage 1, 180 mm in the cultivation stage 2, and 370 mm in the third cultivation stage 3. As the cultivation stage progressed, the integrated PPFD for each stage was increased. Cultivation was performed such that the RB ratio was 2:1, and that the integrated PPFD at the center of the seedling on the surface of the cultivation board was 518 mol/m². A cultivated object occupancy density of 19.55 kg/m³ and a plant diameter of 0.32 m were obtained. However, tipburn, which is a physiological disorder, was generated.

Example 7. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 8 days at a PPFD of 200 µmol/m² s. Cultivation was performed such that the RB ratio was 4:1, and that the integrated PPFD at the center of the seedling on the surface of the cultivation board was 527 mol/m².

Example 8. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 13 days at a PPFD of 200 µmol/m² s. Cultivation was performed such that the RB ratio was 4:1, and that the integrated PPFD at the center of the seedling on the surface of the cultivation board was 613.4 mol/m².

Example 9. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 15 days at a PPFD of 200 µmol/m² s. Cultivation was performed such that the RB ratio was 4:1, and that the integrated PPFD at the center of the seedling on the surface of the cultivation board was 648 mol/m².

Example 10. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 6 days at a PPFD of 250 µmol/m² s. Cultivation was performed such that the RB ratio was 4:1, and that the integrated PPFD at the center of the seedling on the surface of the cultivation board was 518.4 mol/m².

Example 11. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 9 days at a PPFD of 250 µmol/m² s. Cultivation was performed such that the RB ratio was 4:1, and that the integrated PPFD at the center of the seedling on the surface of the cultivation board was 583.2 mol/m².

Example 12. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 13 days at a PPFD of 250 µmol/m² s. Cultivation was performed such that the RB ratio was 4:1, and that the integrated PPFD at the center of the seedling on the surface of the cultivation board was 669.6 mol/m².

Example 13. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 6 days at a PPFD of 300 µmol/m² s. Cultivation was performed such that the RB ratio was 4:1, and that the integrated PPFD at the center of the seedling on the surface of the cultivation board was 544.3 mol/m².

Example 14. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 8 days at a PPFD of 300 µmol/m² s. Cultivation was performed such that the RB ratio was 4:1, and that the integrated PPFD at the center of the seedling on the surface of the cultivation board was 596.2 mol/m².

Example 15. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 10 days at a PPFD of 300 µmol/m² s. Cultivation was performed such that the RB ratio was 4:1, and that the integrated PPFD at the center of the seedling on the surface of the cultivation board was 648 mol/m².

Comparative Example 6. In the seeding stage, white LEDs were used, and irradiation was performed for 24 hours for 9 days at a PPFD of 150 µmol/m² s. In the cultivation stage 1, red LEDs and blue LEDs were used, and irradiation was performed for 24 hours for 9 days at a PPFD of 150 µmol/m² s. In the cultivation stage 2, the red LEDs and the blue LEDs were used, and irradiation was performed for 24 hours for 9 days at a PPFD of 200 µmol/m² s. In the cultivation stage 3, the red LEDs and the blue LEDs were used, and irradiation was performed for 24 hours for 6 days at a PPFD of 200 µmol/m² s. Cultivation was performed such that the RB ratio was 4:1, and that the integrated PPFD at the center of the seedling on the surface of the cultivation board was 492 mol/m².

Example 16. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 7 days at a PPFD of 200 µmol/m² s. Cultivation was performed such that the RB ratio was 4:1, and that the integrated PPFD at the center of the seedling on the surface of the cultivation board was 509.8 mol/m².

Example 17. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 9 days at a PPFD of 200 µmol/m² s. Cultivation was performed such that the RB ratio was 4:1, and that the integrated PPFD at the center of the seedling on the surface of the cultivation board was 544.3 mol/m².

Example 18. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 12 days at a PPFD of 200 µmol/m² s. Cultivation was performed such that the RB ratio was 4:1, and that the integrated PPFD at the center of the seedling on the surface of the cultivation board was 596.2 mol/m².

Example 19. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 6 days at a PPFD of 250 µmol/m² s. Cultivation was performed such that the RB ratio was 4:1, and that the integrated PPFD at the center of the seedling on the surface of the cultivation board was 518.4 mol/m².

Example 20. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 9 days at a PPFD of 250 µmol/m² s. Cultivation was performed such that the RB ratio was 4:1, and that the integrated PPFD at the center of the seedling on the surface of the cultivation board was 583.2 mol/m².

Example 21. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 13 days at a PPFD of 250 µmol/m² s. Cultivation was performed such that the RB ratio was 4:1, and that the integrated PPFD at the center of the seedling on the surface of the cultivation board was 669.6 mol/m².

Example 22. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 6 days at a PPFD of 300 µmol/m² s. Cultivation was performed such that the RB ratio was 4:1, and that the integrated PPFD at the center of the seedling on the surface of the cultivation board was 544.3 mol/m².

Example 23. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 8 days at a PPFD of 300 µmol/m² s. Cultivation was performed such that the RB ratio was 4:1, and that the integrated PPFD at the center of the seedling on the surface of the cultivation board was 596.2 mol/m².

Example 24. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 9 days at a PPFD of 300 µmol/m² s. Cultivation was performed such that the RB ratio was 4:1, and that the integrated PPFD at the center of the seedling on the surface of the cultivation board was 622.1 mol/m².

Comparative Example 7. In the seeding stage, white LEDs were used, and irradiation was performed for 24 hours for 9 days at a PPFD of 150 µmol/m² s. In the cultivation stage 1, the white LEDs were used, and irradiation was performed for 24 hours for 9 days at a PPFD of 150 µmol/m² s. In the cultivation stage 2, the white LEDs were used, and irradiation was performed for 24 hours for 9 days at a PPFD of 200 µmol/m² s. In the cultivation stage 3, the white LEDs were used, and irradiation was performed for 24 hours for 6 days at a PPFD of 200 µmol/m² s. Cultivation was performed such that the RB ratio was 4:1, and that the integrated PPFD at the center of the seedling on the surface of the cultivation board was 492 mol/m².

The present embodiment is not limited to the numerical values and the numerical value ranges of the examples described above, and the numerical values and the numerical value ranges may be changed within the range of the advantageous effect of the present embodiment.

FIGS. 22A to 31C are graphs each presenting correspondence information in which light characteristic information is associated with quality information in the examples of the cultivation method according to the present embodiment. The light characteristic information includes the RB ratio, the red light integrated PPFD, and the blue light integrated PPFD. The quality information indicates quantified quality information obtained by quantifying the quality of leaf vegetables. The quality of the leaf vegetables includes weight, height, diameter, occupancy density, leaf hardness, leaf color, taste, sugar content Brix value, and antioxidant component content of the leaf vegetables. The taste includes sweetness, bitterness, astringency, and so forth.

Figure 22A:
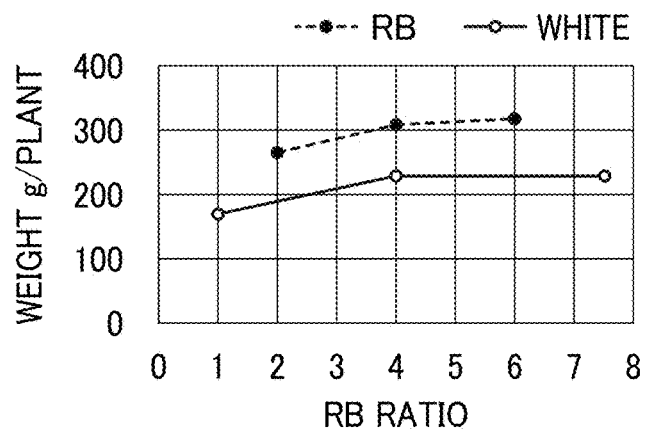
FIGS. 22A to 22C are graphs each presenting correspondence information in which light characteristic information is associated with weight information in the examples of the cultivation method according to the present embodiment.
Figure 22B:
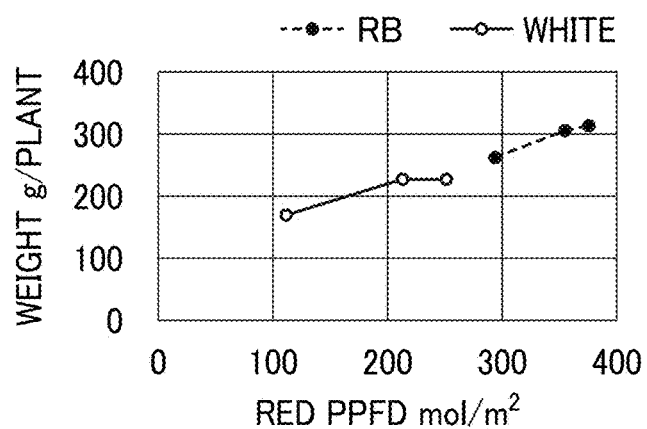
Figure 22C:
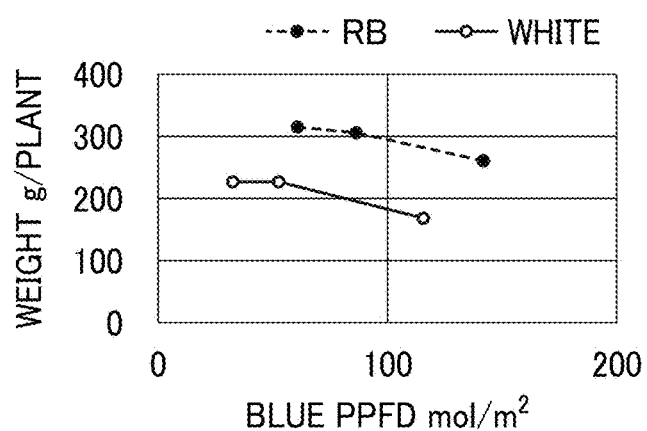

FIGS. 22A to 22C are graphs presenting correspondence information in which the RB ratio, the red light integrated PPFD, and the blue light integrated PPFD are associated with weight information in Examples 1 to 7 illustrated in FIGS. 6 to 9. Weight indicates a weight per plant excluding the root.

The weight can be increased by increasing the RB ratio and the red light integrated PPFD. The weight can be controlled to be larger in the case of the red LEDs and the blue LEDs than the weight in the case of the white LEDs even with the same RB ratio.

In the case of the red LEDs and the blue LEDs, the weight is 262.9 g/plant when the RB ratio=2:1, the weight is 307.9 g/plant when the RB ratio=4:1, and the weight is 316.6 g/plant when the RB ratio=6:1. In the case of the white LEDs, the weight is 169 g/plant when the RB ratio=1:1, the weight is 227.2 g/plant when the RB ratio=4:1, and the weight is 228.2 g/plant when the RB ratio=7:1.

Figure 23A:
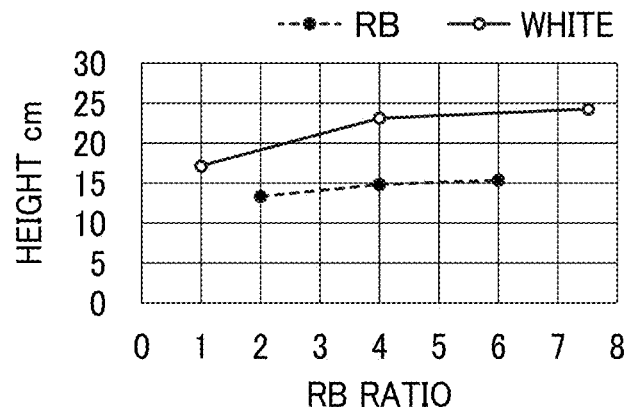
FIGS. 23A to 23C are graphs each presenting correspondence information in which light characteristic information is associated with height information in the examples of the cultivation method according to the present embodiment.
Figure 23B:
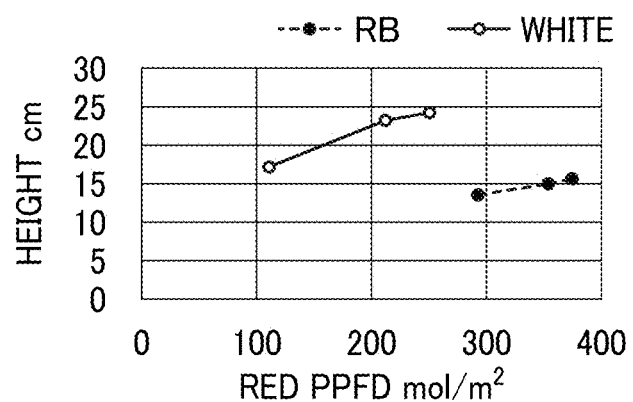
Figure 23C:
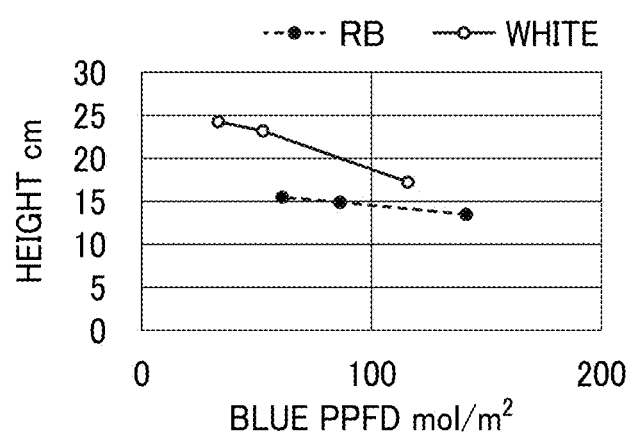

FIGS. 23A to 23C are graphs presenting correspondence information in which the RB ratio, the red light integrated PPFD, and the blue light integrated PPFD are associated with height information in Examples 1 to 7 illustrated in FIGS. 6 to 9. Height indicates the maximum height from the surface of the cultivation board.

The height can be increased by increasing the RB ratio and the red light integrated PPFD. The height can be controlled to be larger in the case of the white LEDs than the height in the case of the red LEDs and the blue LEDs even with the same RB ratio.

In the case of the red LEDs and the blue LEDs, the height is 13.5 cm when the RB ratio=2:1, the height is 14.9 cm when the RB ratio=4:1, and the height is 5 cm when the RB ratio=6:1. In the case of the white LEDs, the height is 17.2 cm when the RB ratio=1:1, the height is 23.0 cm when the RB ratio=4:1, and the height is 24.3 cm when the RB ratio=7:1.

Figure 24A:
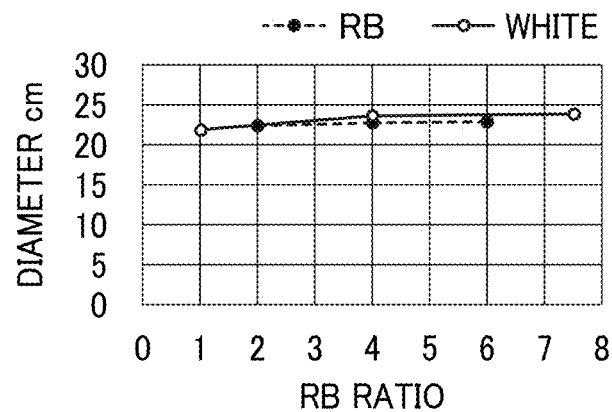
FIGS. 24A to 24C are graphs each presenting correspondence information in which light characteristic information is associated with diameter information in the examples of the cultivation method according to the present embodiment.
Figure 24B:
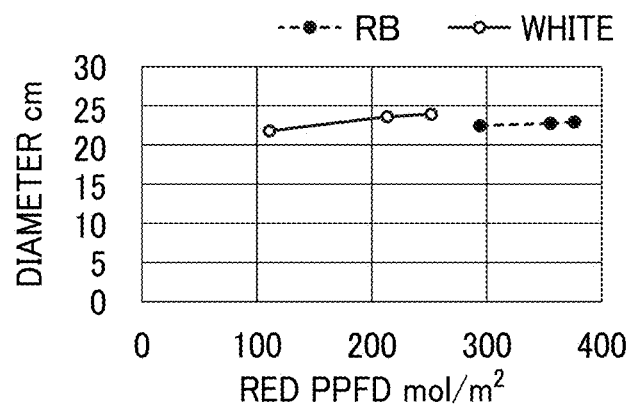
Figure 24C:
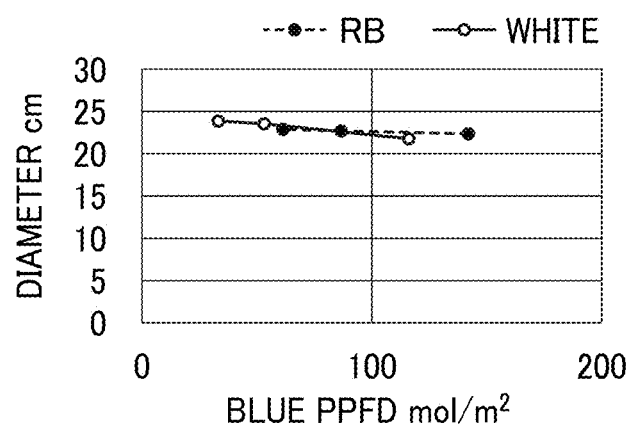

FIGS. 24A to 24C are graphs presenting correspondence information in which the RB ratio, the red light integrated PPFD, and the blue light integrated PPFD are associated with diameter information in Examples 1 to 7 illustrated in FIGS. 6 to 9. Diameter indicates a diameter of a plant.

The diameter can be increased by increasing the RB ratio and the red light integrated PPFD. There is no difference in the diameter control range between the red LEDs and the blue LEDs, and the white LEDs.

In the case of the red LEDs and the blue LEDs, the diameter is 22.4 cm when the RB ratio=2:1, the diameter is 22.7 cm when the RB ratio=4:1, and the diameter is 22.9 cm when the RB ratio=6:1. In the case of the white LEDs, the diameter is 21.8 cm when the RB ratio=1:1, the diameter is 23.6 cm when the RB ratio=4:1, and the diameter is 23.9 cm when the RB ratio=7:1.

Figure 25A:
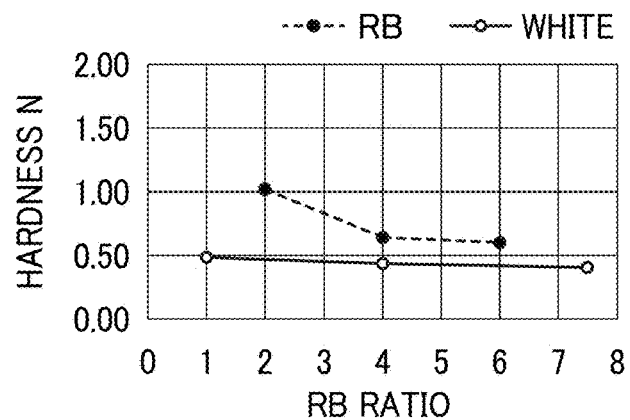
FIGS. 25A to 25C are graphs each presenting correspondence information in which light characteristic information is associated with hardness information in the examples of the cultivation method according to the present embodiment.
Figure 25B:
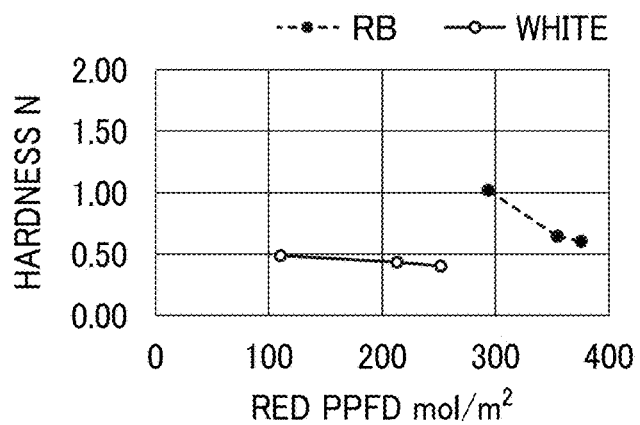
Figure 25C:
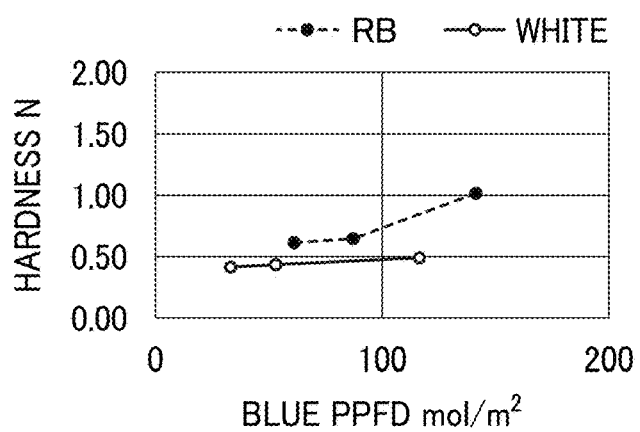

FIGS. 25A to 25C are graphs presenting correspondence information in which the RB ratio, the red light integrated PPFD, and the blue light integrated PPFD are associated with hardness information in Examples 1 to 7 illustrated in FIGS. 6 to 9. Hardness indicates a breaking strength at a distance of 30 mm from the tip of a leaf.

The hardness can be increased by decreasing the RB ratio and increasing the blue light integrated PPFD. The hardness can be controlled to be larger in the case of the red LEDs and the blue LEDs than the hardness in the case of the white LEDs even with the same RB ratio.

In the case of the red LEDs and the blue LEDs, the hardness is 1.02 N when the RB ratio=2:1, the hardness is 0.65 N when the RB ratio=4:1, and the hardness is 0.61 N when the RB ratio=6:1. In the case of the white LEDs, the hardness is 0.49 N when the RB ratio=1:1, the hardness is 0.44 N when the RB ratio=4:1, and the hardness is 0.41 N when the RB ratio=7:1.

Figure 26A:
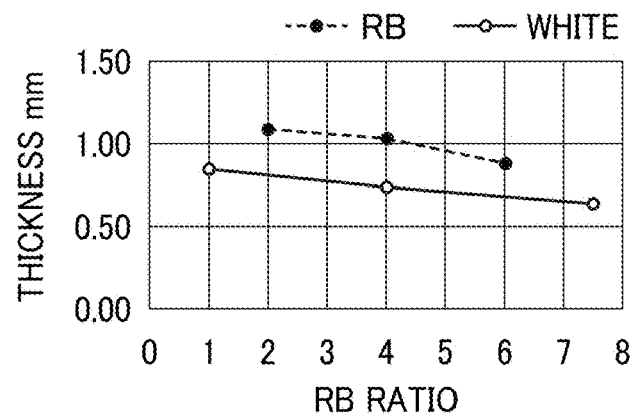
FIGS. 26A to 26C are graphs each presenting correspondence information in which light characteristic information is associated with thickness information in the examples of the cultivation method according to the present embodiment.
Figure 26B:
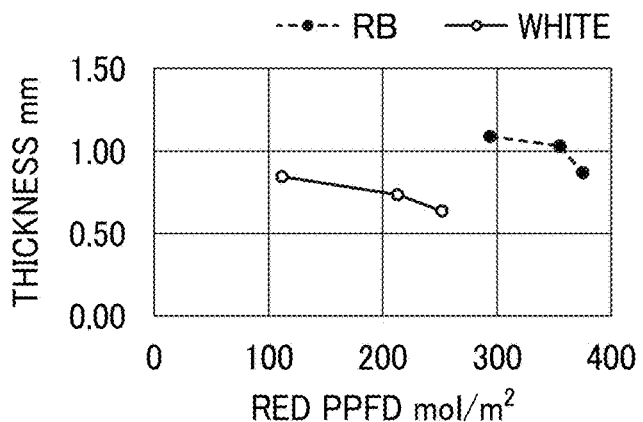
Figure 26C:
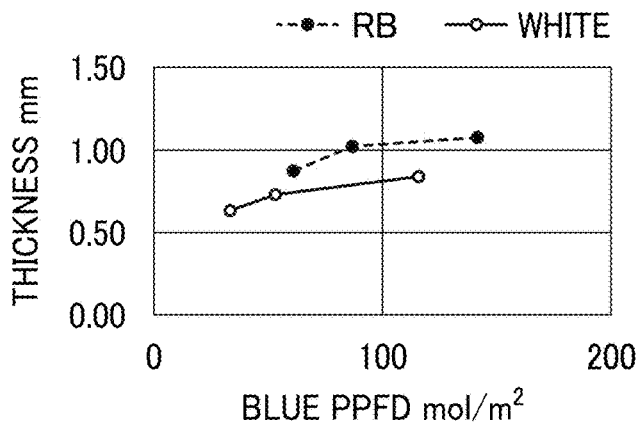

FIGS. 26A to 26C are graphs presenting correspondence information in which the RB ratio, the red light integrated PPFD, and the blue light integrated PPFD are associated with thickness information in Examples 1 to 7 illustrated in FIGS. 6 to 9.

The thickness can be increased by decreasing the RB ratio and increasing the blue light integrated PPFD. The thickness can be controlled to be larger in the case of the red LEDs and the blue LEDs than the thickness in the case of the white LEDs even with the same RB ratio.

In the case of the red LEDs and the blue LEDs, the thickness is 1.08 mm when the RB ratio=2:1, the thickness is 1.02 mm when the RB ratio=4:1, and the thickness is 0.87 mm when the RB ratio=6:1. In the case of the white LEDs, the thickness is 0.84 mm when the RB ratio=1:1, the thickness is 0.73 mm when the RB ratio=4:1, and the thickness is 0.63 mm when the RB ratio=7:1.

Figure 27A:
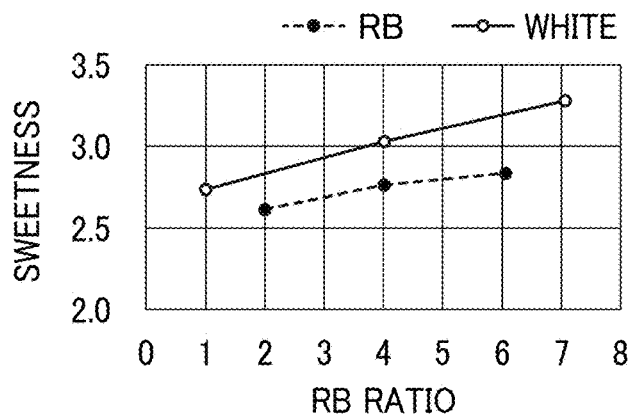
FIGS. 27A to 27C are graphs each presenting correspondence information in which light characteristic information is associated with sweetness information in the examples of the cultivation method according to the present embodiment.
Figure 27B:
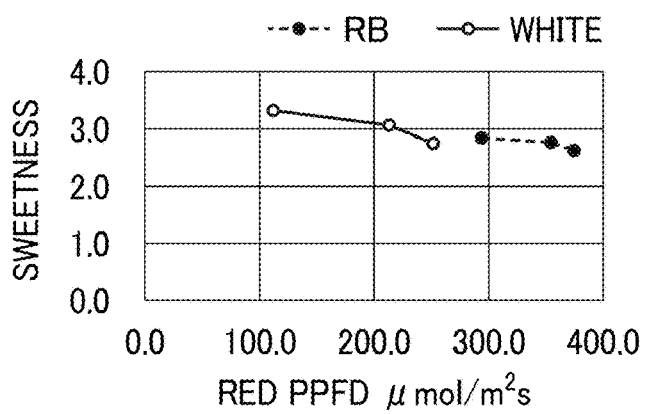
Figure 27C:
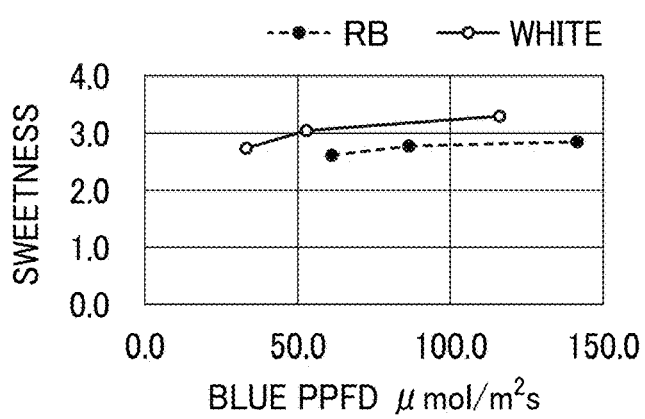

FIGS. 27A to 27C are graphs presenting correspondence information in which the RB ratio, the red light integrated PPFD, and the blue light integrated PPFD are associated with sweetness information in Examples 1 to 7 illustrated in FIGS. 6 to 9. Sweetness indicates a sweetness rank (sweet: rank 5) obtained by taste sensory evaluation.

The sweetness can be increased by increasing the RB ratio and the blue light integrated PPFD. The sweetness can be controlled to be larger in the case of the white LEDs than the sweetness in the case of the red LEDs and the blue LEDs even with the same RB ratio.

In the case of the red LEDs and the blue LEDs, the sweetness is 2.68 when the RB ratio=2:1, the sweetness is 2.78 when the RB ratio=4:1, and the sweetness is 2.85 when the RB ratio=6:1. In the case of the white LEDs, the sweetness is 2.75 when the RB ratio=1:1, the sweetness is 3.05 when the RB ratio=4:1, and the sweetness is 3.31 when the RB ratio=7:1.

Figure 28A:
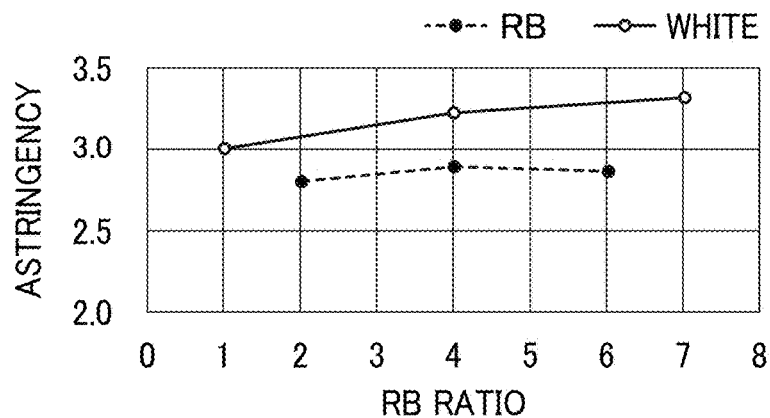
FIGS. 28A to 28C are graphs each presenting correspondence information in which light characteristic information is associated with astringency information in the examples of the cultivation method according to the present embodiment.
Figure 28B:
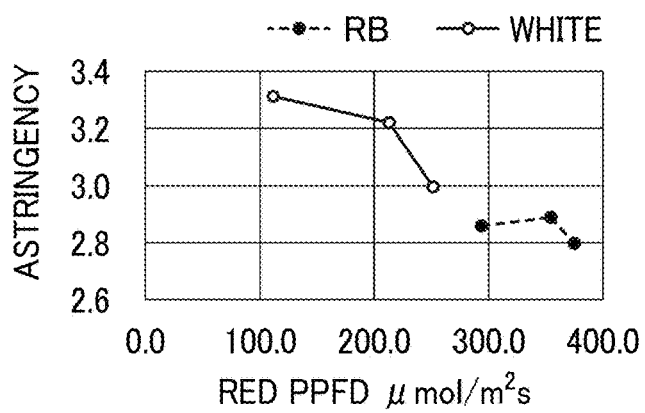
Figure 28C:
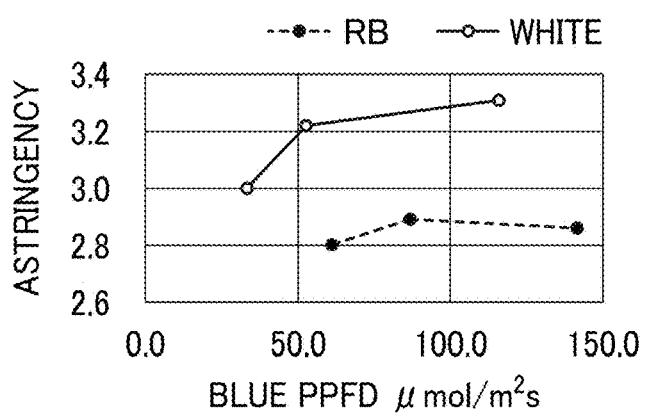

FIGS. 28A to 28C are graphs presenting correspondence information in which the RB ratio, the red light integrated PPFD, and the blue light integrated PPFD are associated with astringency information in Examples 1 to 7 illustrated in FIGS. 6 to 9. Astringency indicates an astringency rank (astringent: rank 5) obtained by taste sensory evaluation.

The astringency can be increased by increasing the RB ratio and the blue light integrated PPFD. The astringency can be controlled to be larger in the case of the white LEDs than the astringency in the case of the red LEDs and the blue LEDs even with the same RB ratio.

In the case of the red LEDs and the blue LEDs, the astringency is 2.80 when the RB ratio=2:1, the astringency is 2.89 when the RB ratio=4:1, and the astringency is 2.86 when the RB ratio=6:1. In the case of the white LEDs, the astringency is 3.00 when the RB ratio=1:1, the astringency is 3.22 when the RB ratio=4:1, and the astringency is 3.31 when the RB ratio=7:1.

Figure 29A:
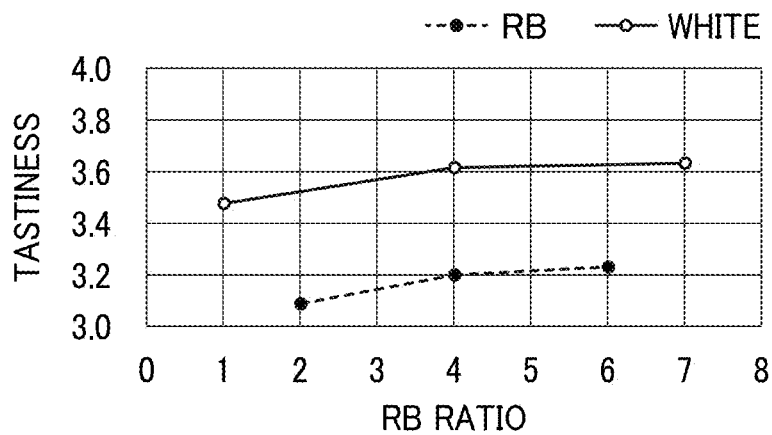
FIGS. 29A to 29C are graphs each presenting correspondence information in which light characteristic information is associated with tastiness information in the examples of the cultivation method according to the present embodiment.
Figure 29B:
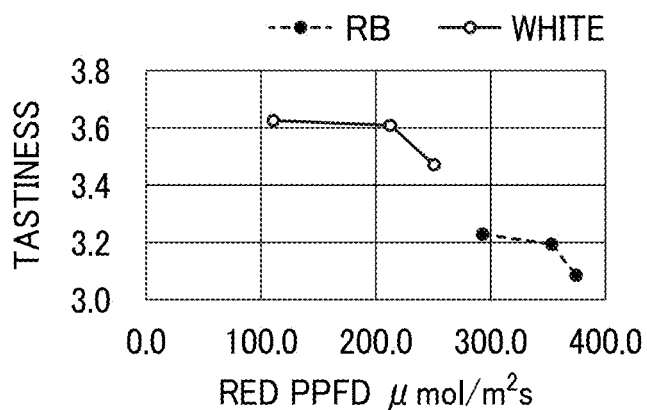
Figure 29C:
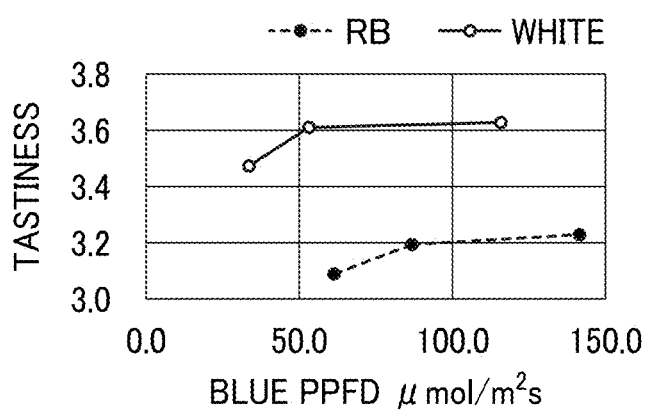

FIGS. 29A to 29C are graphs presenting correspondence information in which the RB ratio, the red light integrated PPFD, and the blue light integrated PPFD are associated with tastiness information in Examples 1 to 7 illustrated in FIGS. 6 to 9.

Tastiness can be increased by increasing the RB ratio and the blue light integrated PPFD. The tastiness can be controlled to be larger in the case of the white LEDs than the tastiness in the case of the red LEDs and the blue LEDs even with the same RB ratio.

In the case of the red LEDs and the blue LEDs, the tastiness is 3.09 when the RB ratio=2:1, the tastiness is 3.19 when the RB ratio=4:1, and the tastiness is 2.23 when the RB ratio=6:1. In the case of the white LEDs, the tastiness is 3.47 when the RB ratio=1:1, the tastiness is 3.61 when the RB ratio=4:1, and the tastiness is 3.63 when the RB ratio=7:1.

Figure 30A:
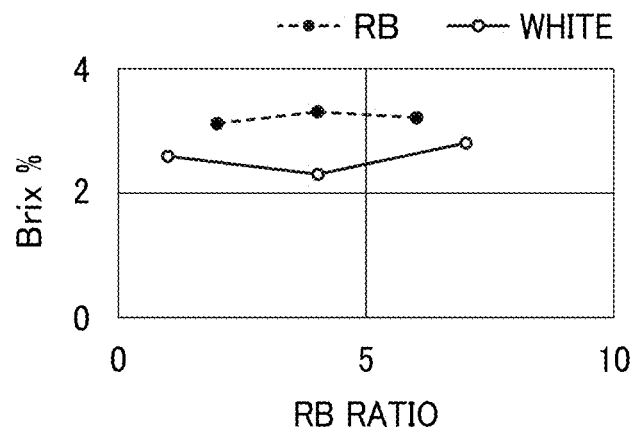
FIGS. 30A to 30C are graphs each presenting correspondence information in which light characteristic information is associated with Brix information in the examples of the cultivation method according to the present embodiment.
Figure 30B:
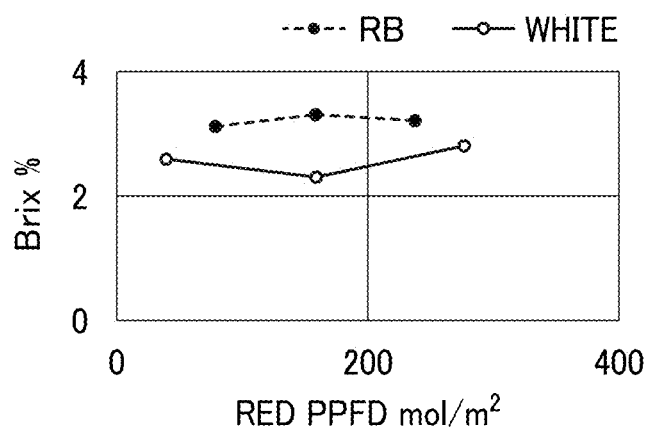
Figure 30C:
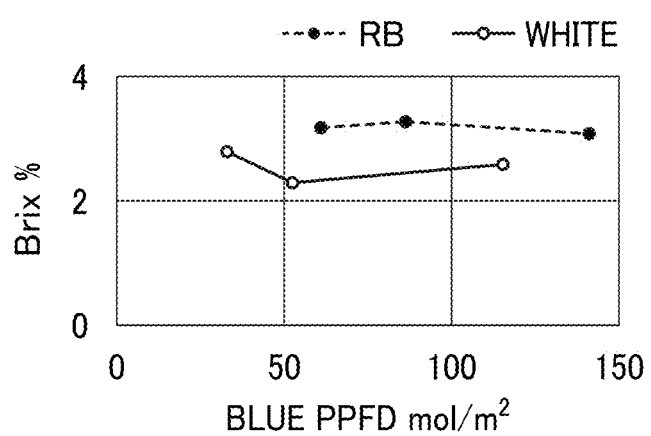

FIGS. 30A to 30C are graphs presenting correspondence information in which the RB ratio, the red light integrated PPFD, and the blue light integrated PPFD are associated with Brix sugar content information in Examples 1 to 7 illustrated in FIGS. 6 to 9. Brix sugar content indicates a measurement value of a Brix meter of an edible portion.

The Brix sugar content can be increased by increasing the RB ratio and the red light integrated PPFD. The Brix sugar content can be controlled to be larger in the case of the red LEDs and the blue LEDs than the Brix sugar content in the case of the white LEDs even with the same RB ratio.

In the case of the red LEDs and the blue LEDs, the Brix sugar content is 3.1% when the RB ratio=2:1, the Brix sugar content is 3.3% when the RB ratio=4:1, and the Brix sugar content is 3.2% when the RB ratio=6:1. In the case of the white LEDs, the Brix sugar content is 2.6% when the RB ratio=1:15, the Brix sugar content is 2.3% when the RB ratio=4:1, and the Brix sugar content is 2.8% when the RB ratio=7:1.

Figure 31A:
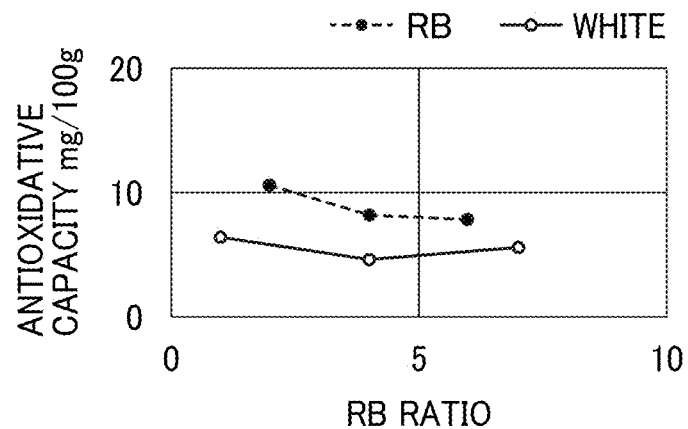
FIGS. 31A to 31C are graphs each presenting correspondence information in which light characteristic information is associated with antioxidative capacity information in the examples of the cultivation method according to the present embodiment.
Figure 31B:
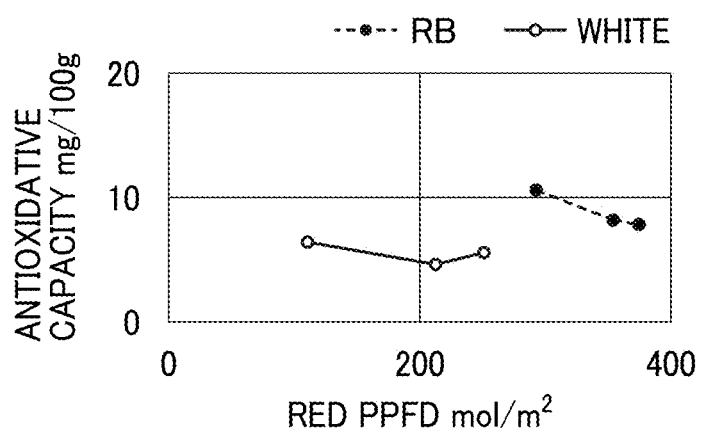
Figure 31C:
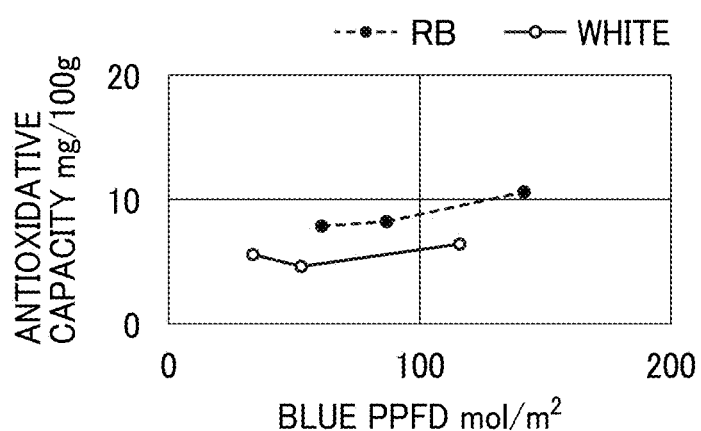

FIGS. 31A to 31C are graphs presenting correspondence information in which the RB ratio, the red light integrated PPFD, and the blue light integrated PPFD are associated with antioxidative capacity information in Examples 1 to 7 illustrated in FIGS. 6 to 9. Antioxidative capacity (antioxidant component content) indicates a measurement value measured by an absorptiometric method (1,1-diphenyl-2-picrylhydrazyl (DPPH) assay) of an edible portion.

The antioxidative capacity can be increased by decreasing the RB ratio and increasing the blue light integrated PPFD. The antioxidative capacity can be controlled to be larger in the case of the red LEDs and the blue LEDs than the antioxidative capacity in the case of the white LEDs even with the same RB ratio.

In the case of the red LEDs and the blue LEDs, the antioxidative capacity is 10.6 mg/100 g when the RB ratio=2:1, the antioxidative capacity is 8.2 mg/100 g when the RB ratio=4:1, and the antioxidative capacity is 7.9 mg/100 g when the RB ratio=6:1. In the case of the white LEDs, the antioxidative capacity is 6.4 mg/100 g when the RB ratio=1:1, the antioxidative capacity is 4.6 mg/100 g when the RB ratio=4:1, and the antioxidative capacity is 5.6 mg/100 g when the RB ratio=7:1.

Figure 32A:
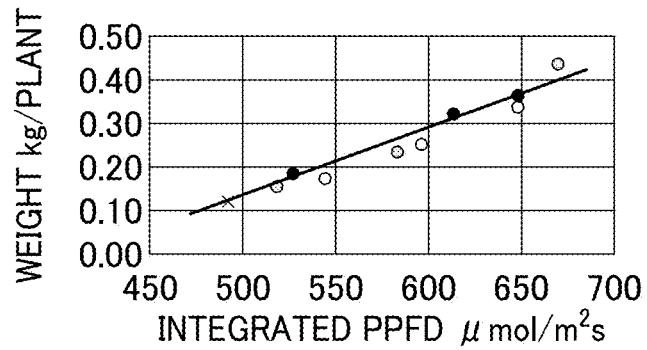
FIGS. 32A to 32C are graphs presenting correspondence information in which light characteristic information is associated with weight information, height information, and diameter information in Examples 7 to 15 of the cultivation method according to the present embodiment.
Figure 32B:
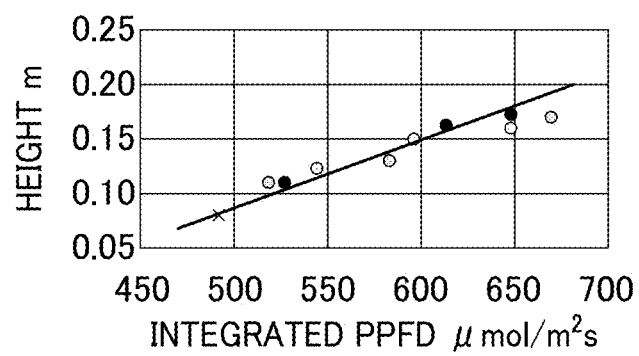
Figure 32C:
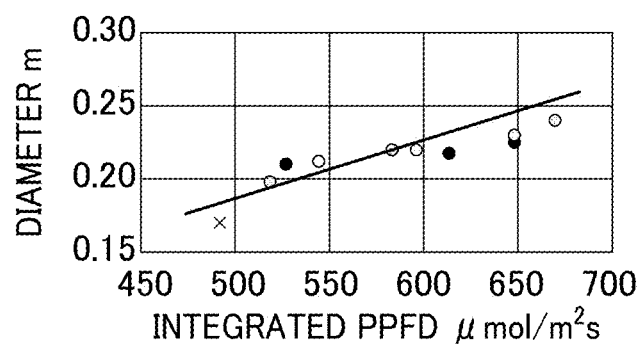
Figure 33A:
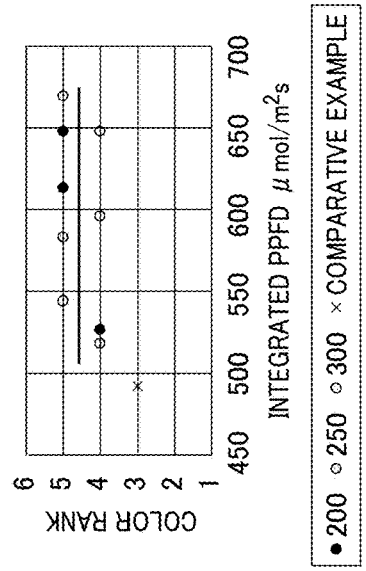
FIGS. 33A to 33F are graphs presenting correspondence information in which light characteristic information is associated with hardness information, thickness information, color rating information, and other items in Examples 7 to 15 of the cultivation method according to the present embodiment.
Figure 33B:
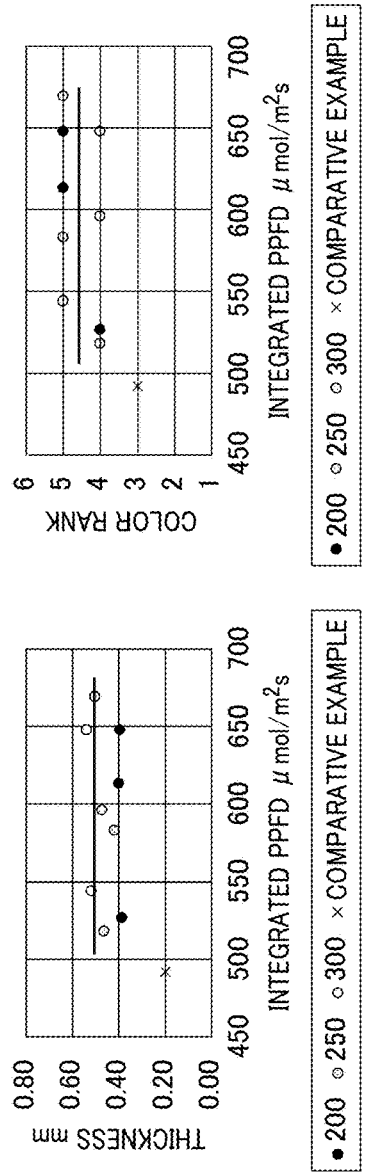
Figure 33C:
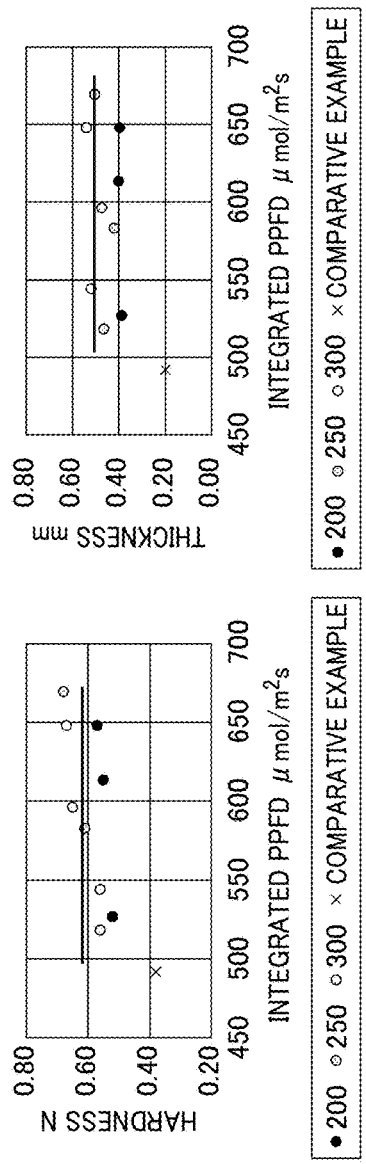
Figure 33D:
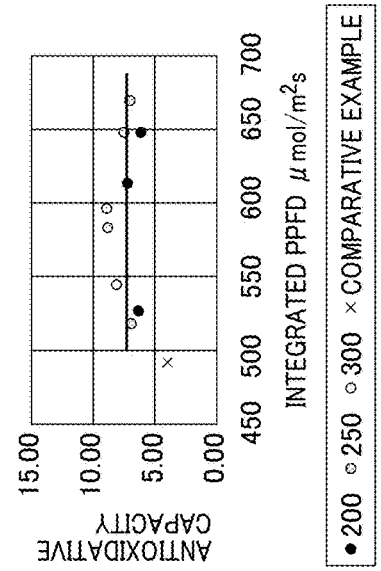
Figure 33E:
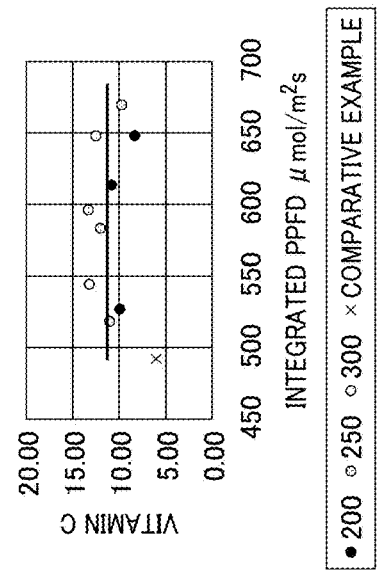
Figure 33F:
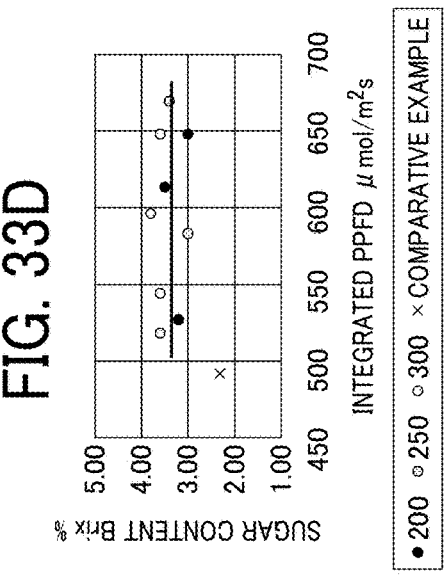

FIGS. 32A to 32C are graphs presenting correspondence information in which light characteristic information is associated with weight information, height information, and diameter information in Examples 7 to 15 of the cultivation method according to the present embodiment.

FIGS. 33A to 33F are graphs presenting correspondence information in which light characteristic information is associated with hardness information, thickness information, color rating information, and other items in Examples 7 to 15 of the cultivation method according to the present embodiment.

The light characteristic information includes the integrated PPFD. The quality information indicates the quantified quality information obtained by quantifying the quality of the leaf vegetables. The quality of the leaf vegetables includes weight, height, diameter, leaf hardness, leaf thickness, leaf color, sugar content Brix value, vitamin C, and antioxidant component content of the leaf vegetables.

FIGS. 32A to 32C indicate that the values of the weight, the height, and the diameter change depending on the value of the integrated PPFD in Examples 7 to 15 and Comparative Example 6.

FIGS. 33A to 33F indicate that the values of the leaf hardness, the leaf thickness, the leaf color, the sugar content Brix value, the vitamin C, and the antioxidant component content are constant in accordance with the value of the integrated PPFD in Examples 7 to 15, whereas the values of the leaf hardness, the leaf thickness, the leaf color, the sugar content Brix value, the vitamin C, and the antioxidant component content change in accordance with the value of the integrated PPFD in Comparative Example 6.

The RB ratio of each of Examples 7 to 15 and Comparative Example 6 is 4:1, and the integrated PPFD of each of Examples 7 to 15 is 500 mol/m$^2$ or more, whereas the integrated PPFD of Comparative Example 6 is less than 500 mol/m$^2$.

That is, in Examples 7 to 15, the ranges of the RB ratio and the integrated PPFD are set in a manner that the leaf hardness, the leaf thickness, the leaf color, the sugar content Brix value, the vitamin C, or the antioxidant component content is constant regardless of the value of the integrated PPFD.

Furthermore, in Examples 7 to 15, the integrated PPFD is changed to keep the leaf hardness, the leaf thickness, the leaf color, the sugar content Brix value, the vitamin C, or the antioxidant component content constant, and to change the value of the weight, the height, or the diameter.

In contrast, in Comparative Example 6, there is no setting of the ranges of the RB ratio and the integrated PPFD in a manner that the leaf hardness, the leaf thickness, the leaf color, the sugar content Brix value, the vitamin C, or the antioxidant component content is constant regardless of the value of the integrated PPFD compared to Examples 7 to 15. That is, since the integrated PPFD is less than 500 mol/m$^2$ in Comparative Example 6, the leaf hardness, the leaf thickness, the leaf color, the sugar content Brix value, the vitamin C, or the antioxidant component content is not kept constant regardless of the integrated PPFD, compared to Examples 7 to 15.

Figure 34A:
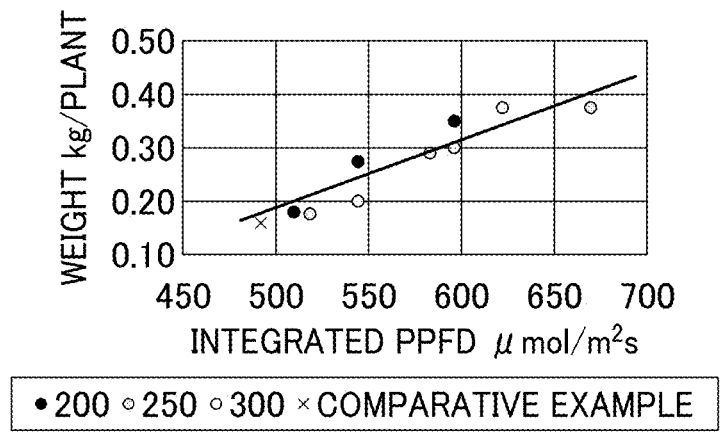
FIGS. 34A to 34C are graphs presenting correspondence information in which light characteristic information is associated with weight information, height information, and diameter information in Examples 16 to 24 of the cultivation method according to the present embodiment.
Figure 34B:
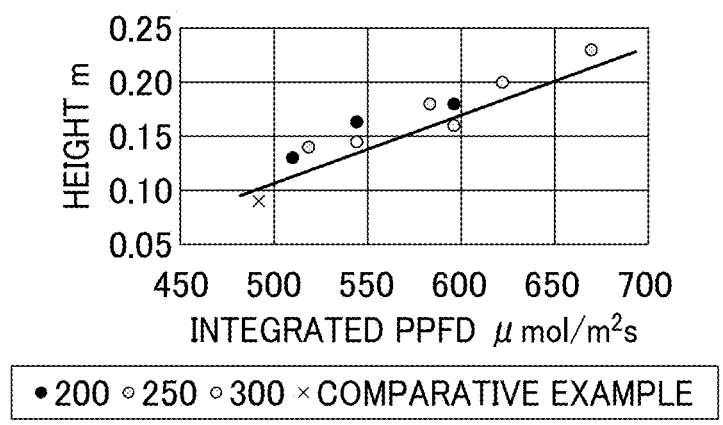
Figure 34C:
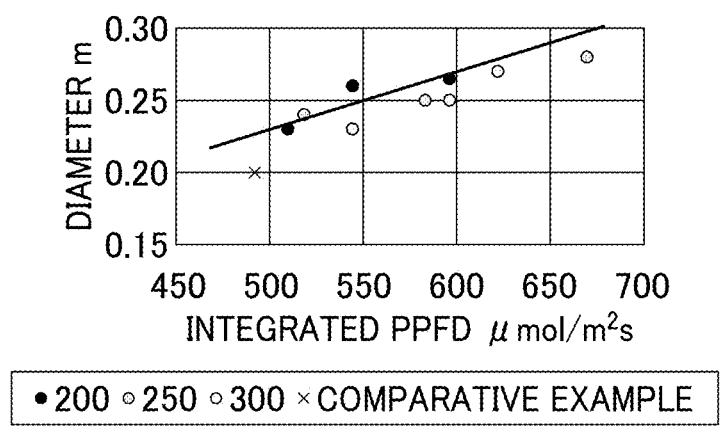
Figure 35A:
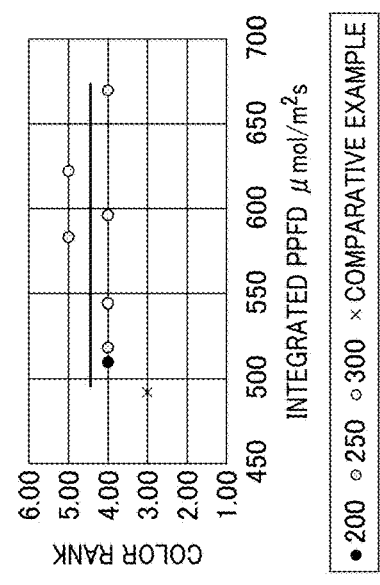
FIGS. 35A to 35F are graphs presenting correspondence information in which light characteristic information is associated with hardness information, thickness information, color rating information, and other items in Examples 16 to 24 of the cultivation method according to the present embodiment.
Figure 35B:
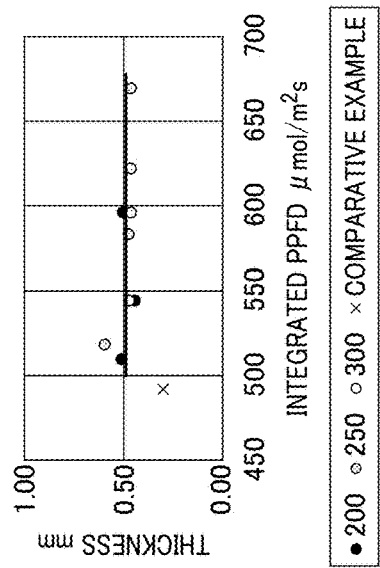
Figure 35C:
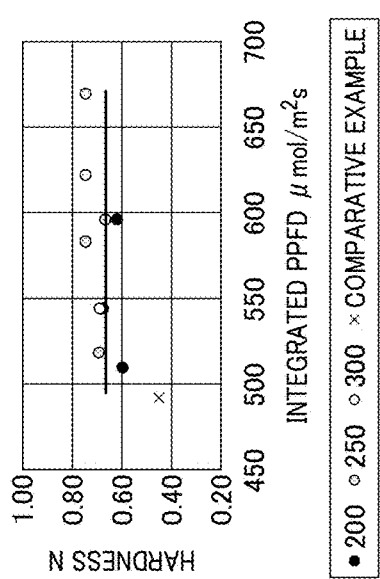
Figure 35D:
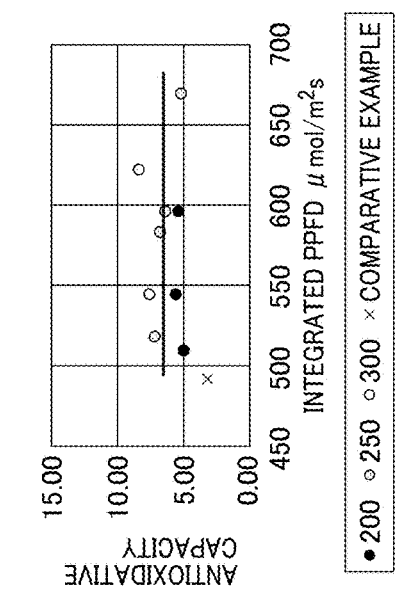
Figure 35E:
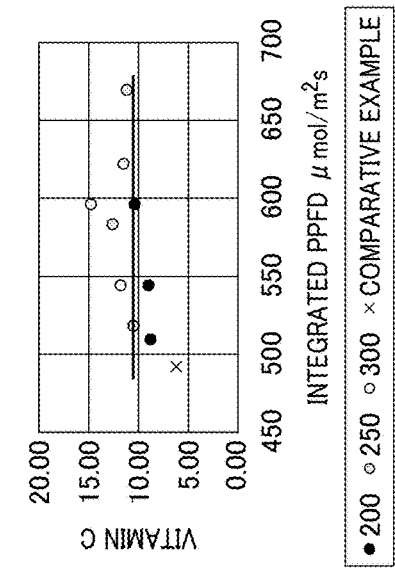
Figure 35F:
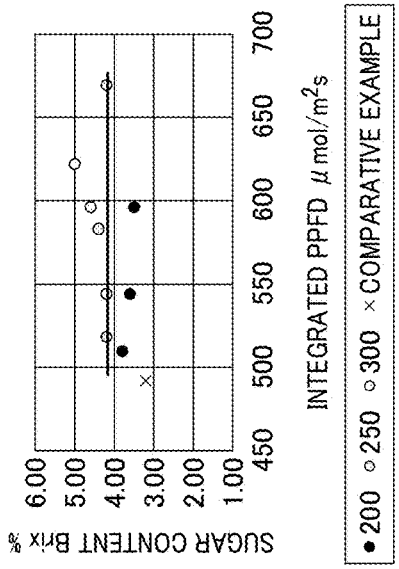

FIGS. 34A to 34C are graphs presenting correspondence information in which light characteristic information is associated with weight information, height information, and diameter information in Examples 16 to 24 of the cultivation method according to the present embodiment.

FIGS. 35A to 35F are graphs presenting correspondence information in which light characteristic information is associated with hardness information, thickness information, color rating information, and other items in Examples 16 to 24 of the cultivation method according to the present embodiment.

The light characteristic information includes the integrated PPFD. The quality information indicates the quantified quality information obtained by quantifying the quality of the leaf vegetables. The quality of the leaf vegetables includes weight, height, diameter, leaf hardness, leaf thickness, leaf color, sugar content Brix value, vitamin C, and antioxidant component content of the leaf vegetables.

FIGS. 34A to 34C indicate that the values of the weight, the height, and the diameter change depending on the value of the integrated PPFD in Examples 16 to 24 and Comparative Example 7.

FIGS. 35A to 35F indicate that the values of the leaf hardness, the leaf thickness, the leaf color, the sugar content Brix value, the vitamin C, and the antioxidant component content are constant in accordance with the value of the integrated PPFD in Examples 16 to 24, whereas the values of the leaf hardness, the leaf thickness, the leaf color, the sugar content Brix value, the vitamin C, and the antioxidant component content change in accordance with the value of the integrated PPFD in Comparative Example 7.

The RB ratio of each of Examples 16 to 24 and Comparative Example 7 is 4:1, and the integrated PPFD of each of Examples 7 to 15 is 500 mol/m$^2$ or more, whereas the integrated PPFD of Comparative Example 6 is less than 500 mol/m$^2$.

That is, in Examples 16 to 24, the ranges of the RB ratio and the integrated PPFD are set in a manner that the leaf hardness, the leaf thickness, the leaf color, the sugar content Brix value, the vitamin C, or the antioxidant component content is constant regardless of the value of the integrated PPFD.

Furthermore, in Examples 16 to 24, the integrated PPFD is changed to keep the leaf hardness, the leaf thickness, the leaf color, the sugar content Brix value, the vitamin C, or the antioxidant component content constant, and to change the value of the weight, the height, or the diameter.

In contrast, in Comparative Example 7, there is no setting of the ranges of the RB ratio and the integrated PPFD in a manner that the leaf hardness, the leaf thickness, the leaf color, the sugar content Brix value, the vitamin C, or the antioxidant component content is constant regardless of the value of the integrated PPFD, compared to Examples 16 to 24. That is, since the integrated PPFD is less than 500 mol/m$^2$ in Comparative Example 7, the leaf hardness, the leaf thickness, the leaf color, the sugar content Brix value, the vitamin C, or the antioxidant component content is not kept constant regardless of the integrated PPFD, compared to Examples 7 to 15.

The present embodiment is not limited to the numerical values and the numerical value ranges of the correspondence information described with reference to FIGS. 22A to 35F, and the numerical values and the numerical value ranges of the correspondence information may be changed within the range of the advantageous effect of the present embodiment.

Figure 36:
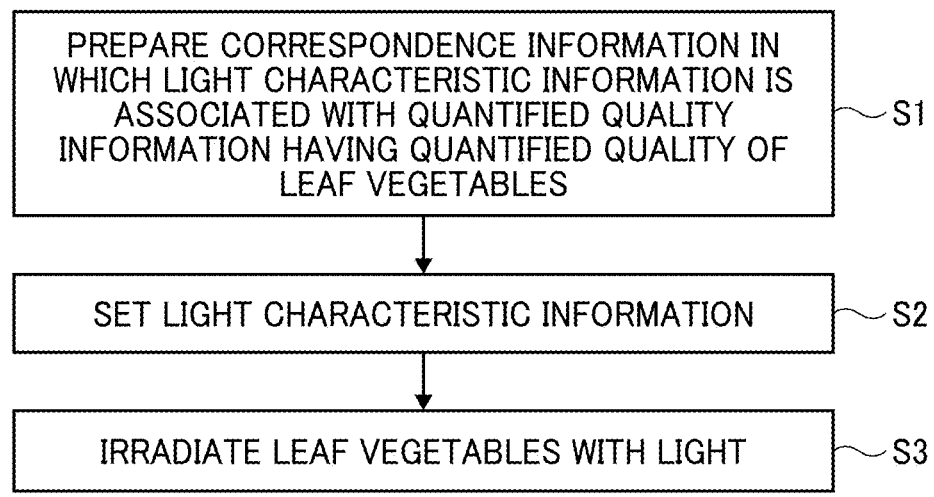
FIG. 36 is a flowchart presenting steps of the cultivation method according to the present embodiment.

FIG. 36 is a flowchart presenting steps of the cultivation method according to the present embodiment.

As described with reference to FIGS. 22A to 35F, the cultivation method according to the present embodiment includes a step of preparing correspondence information in which light characteristic information is associated with quantified quality information for each of a plurality of qualities (step S1). The plurality of qualities include at least two qualities of weight, height, diameter, occupancy density, leaf hardness, leaf color, taste, sugar content Brix value, and antioxidant component content of the leaf vegetables. The taste includes sweetness, bitterness, astringency, and so forth.

The cultivation method according to the present embodiment also includes a step of setting light characteristic information based on a target value of the quantified quality information and the correspondence information prepared in step S1 (step S2).

The cultivation method according to the present embodiment further includes a step of irradiating leaf vegetables with light based on the light characteristic information set in step S2 (step S3).

Accordingly, the cultivation method according to the present embodiment can set the light characteristic information required for obtaining the target value of the quantified quality information based on the target value of the quantified quality information and the correspondence information in which the light characteristic information is associated with the quantified quality information.

In the cultivation method according to the present embodiment, the leaf vegetables satisfying the target value of the quantified quality information can be obtained by irradiating the leaf vegetables with light based on the set light characteristic information.

Furthermore, the cultivation method according to the present embodiment can obtain the leaf vegetables satisfying the target value of the quantified quality information for each of the plurality of qualities.

Figure 37:
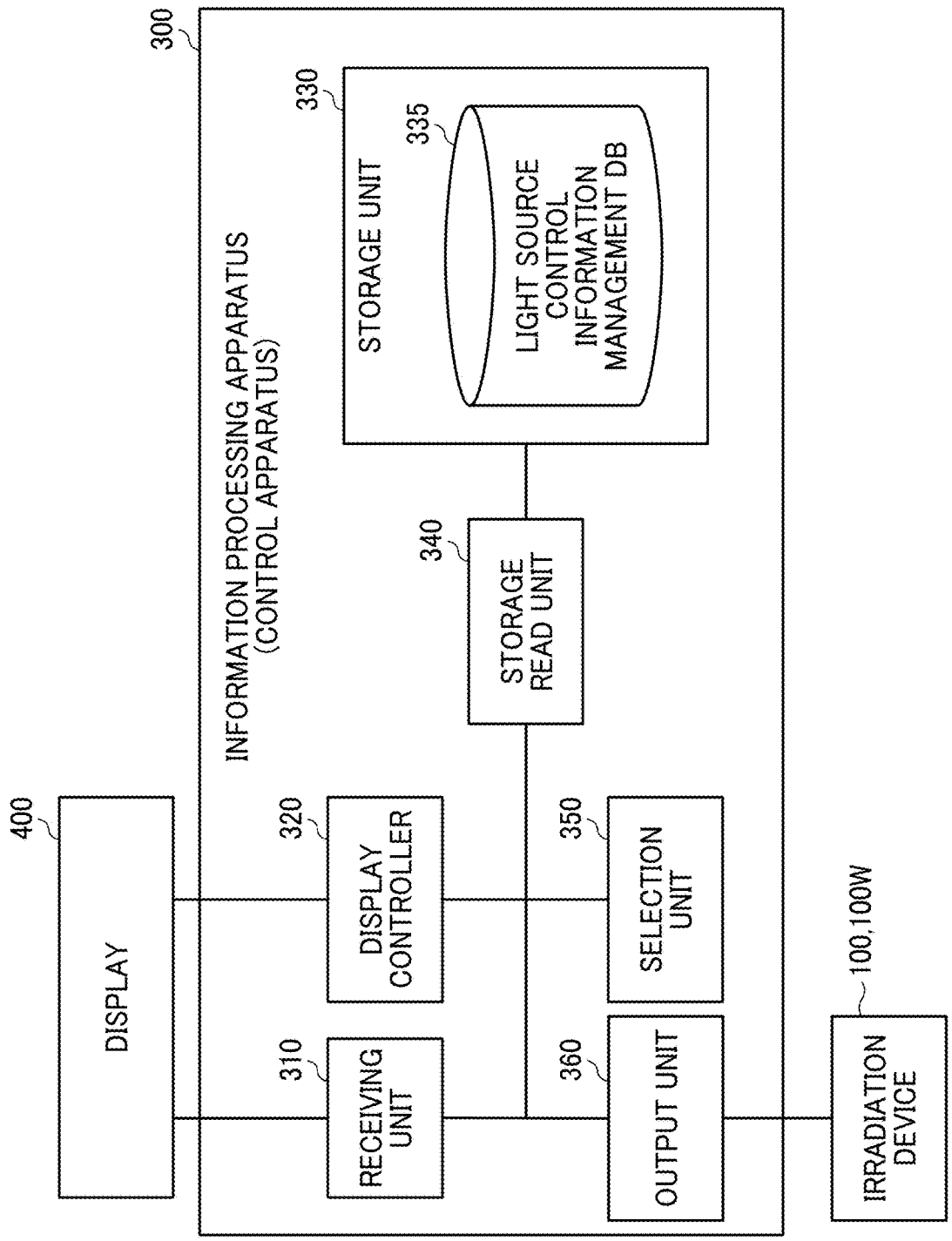
FIG. 37 is a block diagram illustrating an example of an information processing apparatus (control apparatus) according to the present embodiment.

FIG. 37 is a block diagram illustrating an example of an information processing apparatus 300 (control apparatus) according to the present embodiment.

The information processing apparatus 300 illustrated in FIG. 37 includes a display 400 serving as an example of a displaying unit, and controls the irradiation devices 100 and 100W. The information processing apparatus 300 is also an example of a control apparatus that controls the first light sources 111 and 121 and the second light sources 112 and 122 of the irradiation device 100 and the third light sources 150 of the irradiation device 100W. The display 400 includes a touch panel and also serves as an example of an input unit.

The information processing apparatus 300 is constructed by a computer, and the functions implemented by the information processing apparatus 300 include a receiving unit 310, a display controller 320, a storage unit 330, a storage read unit 340, a selection unit 350, and an output unit 360.

The receiving unit 310 has a function of receiving input by a user to the input unit such as the touch panel of the display 400. The display controller 320 has a function of displaying various screens on the display 400. A light source control information management DB 335 is constructed in the storage unit 330.

The storage read unit 340 is an example of a storage controller, and has a function of storing various pieces of data in the storage unit 330 or reading various pieces of data from the storage unit 330.

The selection unit 350 has a function of selecting light source control information corresponding to quality information based on light source information and quality information input by the user.

The output unit 360 has a function of controlling the irradiation device 100 and the irradiation device 100W based on the light source control information selected by the selection unit 350.

FIG. 38 is a conceptual illustration presenting an example of a light source control information management table according to the present embodiment. The light source control information management DB 335 illustrated in FIG. 37 includes a light source control information management table as presented in FIG. 38.

The light source control information management table stores and manages correspondence information in which light characteristic information indicative of characteristics of light with which leaf vegetables are irradiated is associated with quantified quality information having a quantified quality of leaf vegetables as illustrated in FIGS. 22A to 35F (an example of a step of storing).

Specifically, the light source control information management table stores and manages correspondence information in which the RB ratio, the red light integrated PPFD, and the blue light integrated PPFD are associated with quality information such as weight and height for each piece of quality information of such as weight and height, for each piece of light source information indicative of whether the light source is the RB light source or the white light source.

For example, the light source control information management table stores and manages correspondence information in which the weight of 262.9 is associated with the RB ratio of 2, the weight of 307.9 is associated with the RB ratio of 4, and the weight of 316.6 is associated with the RB ratio of 6 for the weight in the case of the RB light source.

Figure 39:
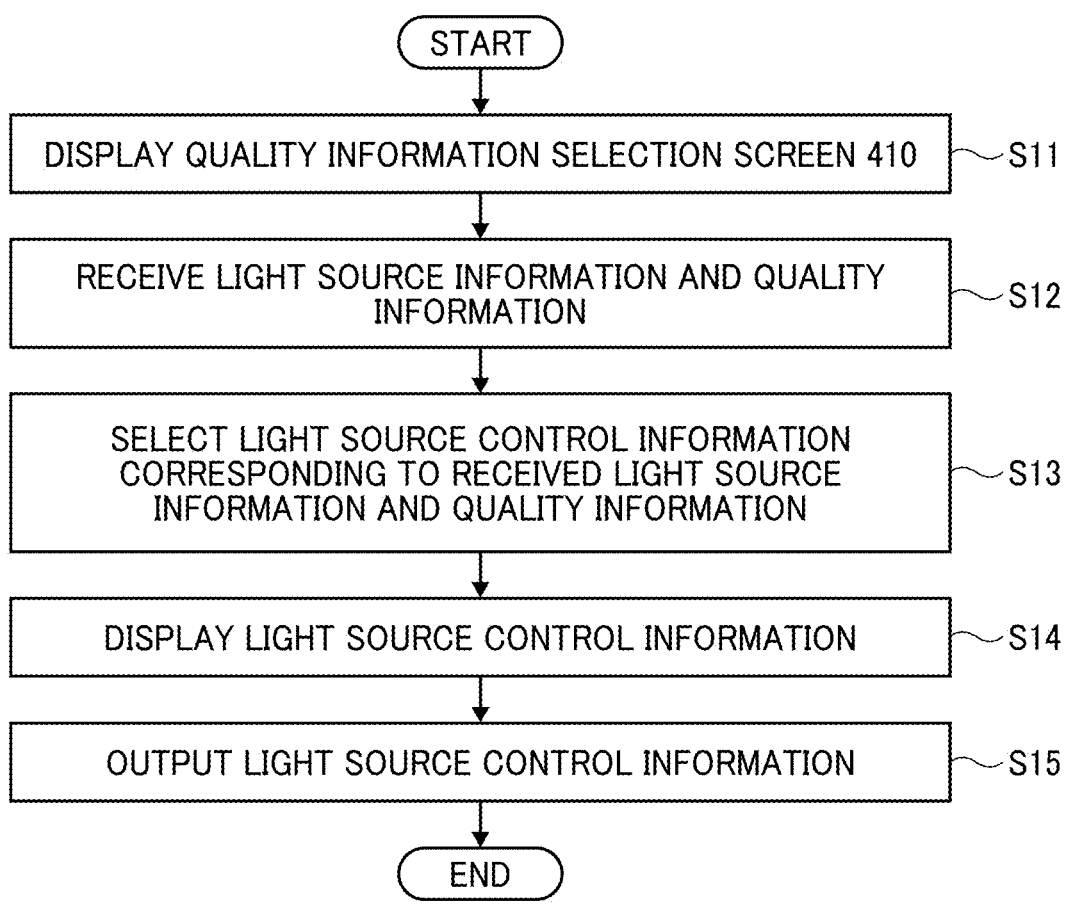
FIG. 39 is a flowchart presenting an example of processing (information processing method, control method) in the information processing apparatus according to the present embodiment.

FIG. 39 is a flowchart presenting an example of processing in the information processing apparatus 300 according to the present embodiment. FIG. 39 is also a flowchart illustrating an example of an information processing method and a control method according to the present embodiment.

The display controller 320 of the information processing apparatus 300 controls the display 400 to display a quality information selection screen 410 (step S11).

The receiving unit 310 of the information processing apparatus 300 receives light source information and quality information input from the touch panel of the display 400 (step S12). Step S12 is an example of a step of receiving input of quantified quality information.

The selection unit 350 of the information processing apparatus 300 selects light characteristic information corresponding to the light source information and the quality information received by the receiving unit 310 as light source control information (step S13). Step S13 is an example of a step of selecting.

Specifically, first, the storage read unit 19 of the information processing apparatus 300 reads the light source control information management table from the light source control information management DB 335. The selection unit 350 selects, as the light source control information, the light characteristic information corresponding to the light source information and the quality information received by the receiving unit 310 from among data stored in the light source control information management table illustrated in FIG. 38.

The display controller 320 displays the light source control information selected by the selection unit 350 on the quality information selection screen 410 (step S14). Step S14 is an example of a step of controlling the displaying unit to display the light characteristic information corresponding to the quantified quality information received in the step of receiving based on the quantified quality information received in the step of receiving and the correspondence information.

The output unit 360 of the information processing apparatus 300 outputs the light source control information selected by the selection unit 350 to the irradiation device 100 or the irradiation device 100W (step S15). Step S15 is an example of a step of outputting a signal for controlling a light source that irradiates leaf vegetables with light based on the quantified quality information received in the step of receiving and the correspondence information.

The irradiation device 100 controls the first light sources 111 and 121 and the second light sources 112 and 122 based on the light source control information output from the output unit 360. The irradiation device 100W controls the third light sources 150 based on the light source control information output from the output unit 360.

Figure 40:
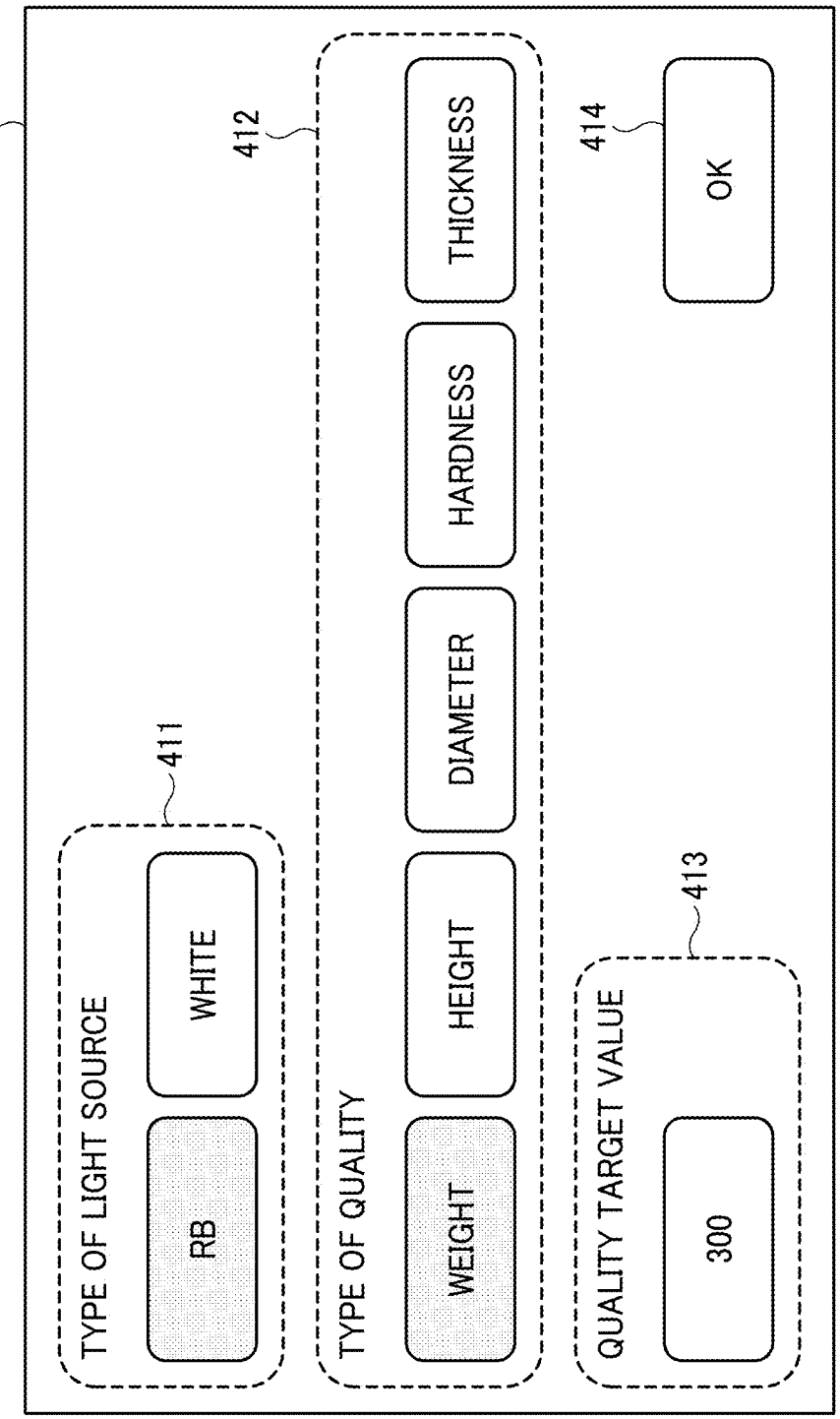
FIG. 40 is a view illustrating an example of a display screen displayed on the information processing apparatus according to the present embodiment.

FIG. 40 is a view illustrating an example of a display screen displayed on the information processing apparatus 300 according to the present embodiment.

The quality information selection screen 410 illustrated in FIG. 40 is displayed in step S11 presented in FIG. 39, and includes a light source type input region 411, a quality type input region 412, a quality target value input region 413, and an input confirmation button 414.

Figure 41:
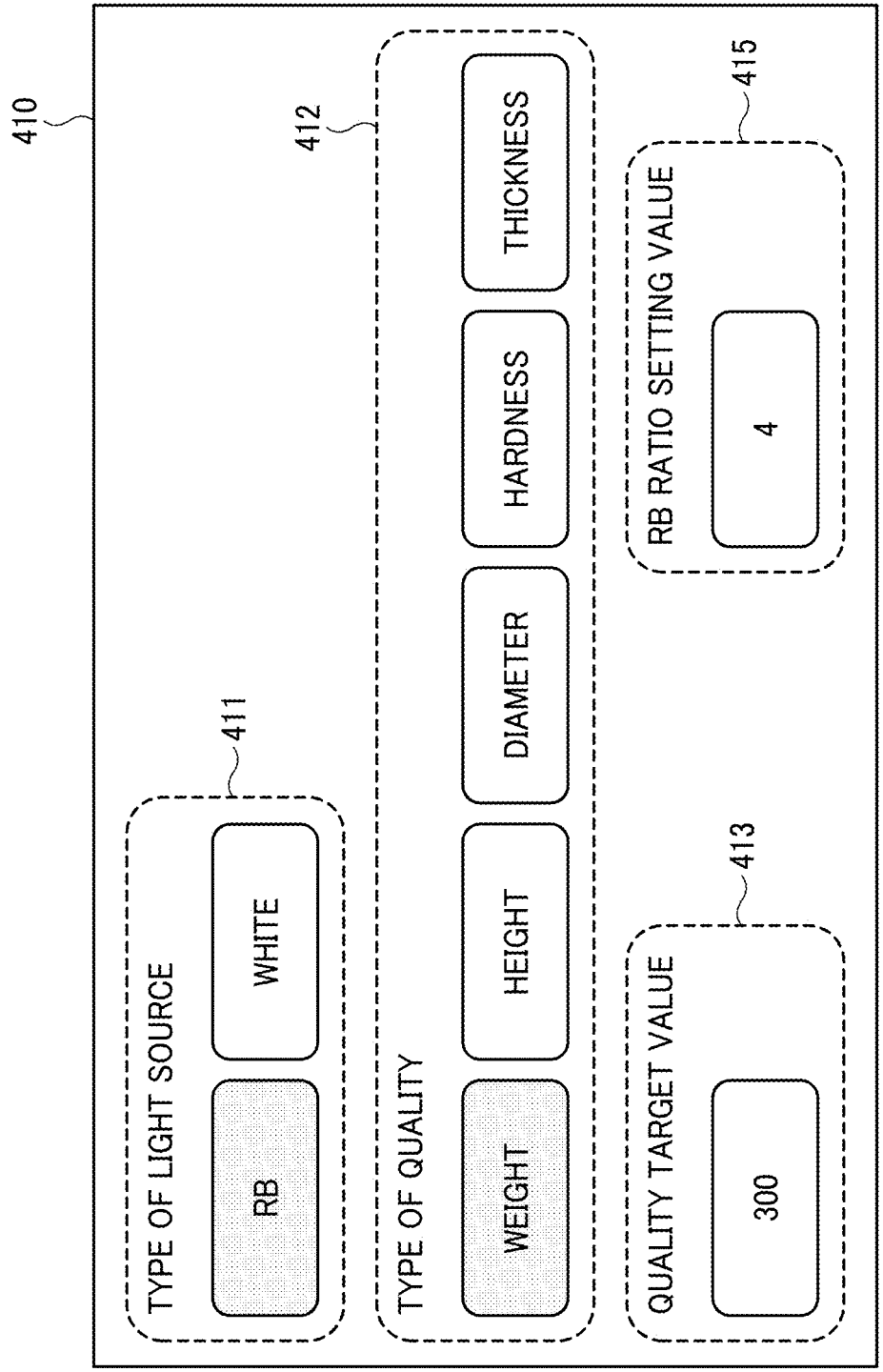
FIG. 41 is a view illustrating another example of the display screen displayed on the information processing apparatus according to the present embodiment.

FIG. 40 illustrates an example in which the user inputs the RB light source as the type of light source, inputs the weight as the type of quality, and inputs 300 as the quality target value. In this state, when the user presses the input confirmation button 414, in step S12 presented in FIG. 39, the receiving unit 310 receives the RB light source as the light source information and receives the weight and the target value of 300 as the quality information. FIG. 41 is a view illustrating another example of the display screen displayed on the information processing apparatus 300 according to the present embodiment.

The quality information selection screen 410 illustrated in FIG. 41 is displayed by the display controller 320 in step S14 presented in FIG. 39, and includes a light source type input region 411, a quality type input region 412, and a quality target value input region 413, as in FIG. 40, and includes a light source control information display region 415 instead of the input confirmation button 414 illustrated in FIG. 40.

In the example of FIG. 41, an RB ratio setting value of 4 is displayed as the light source control information in correspondence with the RB light source as the light source information, the weight as the quality information, and the target value of 300.

As described above, a cultivation method for cultivating leaf vegetables according to an embodiment of the present disclosure includes a step of preparing correspondence information in which light characteristic information indicative of a characteristic of light with which leaf vegetables are irradiated is associated with quantified quality information having a quantified quality of leaf vegetables; a step of setting the light characteristic information; and a step of irradiating the leaf vegetables with light.

Accordingly, the light with which the leaf vegetables are irradiated can be controlled in association with the quality of the leaf vegetables.

More particularly, the light characteristic information required for obtaining a target value of the quantified quality information can be set based on the target value of the quantified quality information and the correspondence information in which the light characteristic information is associated with the quantified quality information. The leaf vegetables satisfying the target value of the quantified quality information can be obtained by irradiating the leaf vegetables with light based on the set light characteristic information.

The quality includes a plurality of qualities, and the step of preparing prepares the correspondence information for each of the plurality of qualities. Accordingly, the leaf vegetables satisfying the target value of the quantified quality information can be obtained for each of the plurality of qualities.

The plurality of qualities include at least two qualities of weight, height, diameter, occupancy density, leaf hardness, leaf color, taste, sugar content Brix value, and antioxidant component content of the leaf vegetables. Accordingly, the leaf vegetables satisfying the target value of the quantified quality information can be obtained for each of the at least two qualities of the weight, the height, the diameter, the occupancy density, the leaf hardness, the leaf color, the taste, the sugar content Brix value, and the antioxidant component content of the leaf vegetables. The taste includes sweetness, bitterness, astringency, and so forth.

The light characteristic information includes an integrated photosynthetic photon flux density of light. Accordingly, the integrated photosynthetic photon flux density of the light required for obtaining the target value of the quantified quality information can be set. The leaf vegetables satisfying the target value of the quantified quality information can be obtained by irradiating the leaf vegetables with light based on the set integrated photosynthetic photon flux density of the light.

The integrated photosynthetic photon flux density is an integrated photosynthetic photon flux density of red light having a wavelength range from 600 nm to 700 nm. Accordingly, the integrated photosynthetic photon flux density of the red light required for obtaining the target value of the quantified quality information can be set. The leaf vegetables satisfying the target value of the quantified quality information can be obtained by irradiating the leaf vegetables with light based on the set integrated photosynthetic photon flux density of the red light.

The photosynthetic photon flux density of the red light is not particularly limited; however, is preferably 40 $\mu mol/m^2$ s or more and 214 $\mu mol/m^2$ s or less.

The integrated photosynthetic photon flux density is an integrated photosynthetic photon flux density of blue light having a wavelength range from 400 nm to 499 nm. Accordingly, the integrated photosynthetic photon flux density of the blue light required for obtaining the target value of the quantified quality information can be set. The leaf vegetables satisfying the target value of the quantified quality information can be obtained by irradiating the leaf vegetables with light based on the set integrated photosynthetic photon flux density of the blue light.

The photosynthetic photon flux density of the blue light is not particularly limited, but is preferably 12 $\mu mol/m^2$ s or more and 120 $\mu mol/m^2$ s or less.

The photosynthetic photon flux density of light other than the red light and the blue light is not particularly limited, but is preferably 65 $\mu mol/m^2$ s or less.

The step of irradiating provides irradiation with light in a manner that an integrated photosynthetic photon flux density is 500 $mol/m^2$ or more, or preferably 518 $mol/m^2$ or more. Accordingly, the area used for cultivation can be optimized for each cultivation stage, enabling quality controlled cultivation with high production efficiency.

The light characteristic information includes a ratio between photosynthetic photon flux densities of first light and second light having different wavelength ranges. Accordingly, the ratio between the integrated photosynthetic photon flux densities of the first light and the second light required for obtaining the target value of the quantified quality information can be set. The leaf vegetables satisfying the target value of the quantified quality information can be obtained by irradiating the leaf vegetables with light based on the set ratio between the integrated photosynthetic photon flux densities of the first light and the second light.

The first light is red light having a wavelength range from 600 nm to 700 nm, and the second light is blue light having a wavelength range from 400 nm to 499 nm. Accordingly, the ratio between the integrated photosynthetic photon flux densities of the red light and the blue light required for obtaining the target value of the quantified quality information can be set. The leaf vegetables satisfying the target value of the quantified quality information can be obtained by irradiating the leaf vegetables with light based on the set ratio between the integrated photosynthetic photon flux densities of the red light and the blue light.

The step of irradiating desirably provides irradiation with light in a manner that a ratio between a photosynthetic photon flux density of the red light and a photosynthetic photon flux density of the blue light falls within a range from 7:1 to 1:1.

The step of preparing prepares the correspondence information for at least one quality of leaf hardness, leaf thickness, leaf color, sugar content Brix value, vitamin C, and antioxidant component content of the leaf vegetables. The step of setting sets a ratio between a photosynthetic photon flux density of the red light and a photosynthetic photon flux density of the blue light and setting a range of the integrated photosynthetic photon flux density in a manner that the leaf hardness, the leaf thickness, the leaf color, the sugar content Brix value, the vitamin C, or the antioxidant component content is constant regardless of a value of the integrated photosynthetic photon flux density.

Accordingly, it is possible to prevent the leaf hardness, the leaf thickness, the leaf color, the sugar content Brix value, the vitamin C, or the antioxidant component content from being changed by a change in the value of the integrated photosynthetic photon flux density.

The step of preparing prepares the correspondence information for each of a plurality of qualities including at least one quality of weight, height, and diameter of the leaf vegetables and at least one quality of the leaf hardness, the leaf thickness, the leaf color, the sugar content Brix value, the vitamin C, and the antioxidant component content. The step of setting changes the integrated photosynthetic photon flux density to keep the leaf hardness, the leaf thickness, the leaf color, the sugar content Brix value, the vitamin C, or the antioxidant component content constant and to change a value of the weight, the height, or the diameter.

Accordingly, the leaf hardness, the leaf thickness, the leaf color, the sugar content Brix value, the vitamin C, or the antioxidant component content can be kept constant, and the value of the weight, the height, or the diameter can be changed.

The step of irradiating includes a seeding stage and a cultivation stage after the seeding stage. A plant interval between the leaf vegetables in the cultivation stage is increased to be 9 times or less the plant interval between the leaf vegetables in the seeding stage. Accordingly, productivity can be increased.

The step of irradiating includes a seeding stage, a plant interval between the leaf vegetables in the seeding stage being 30 mm or less. Accordingly, productivity can be increased.

An information processing method according to an embodiment of the present disclosure includes a step of storing correspondence information in which light characteristic information indicative of a characteristic of light with which leaf vegetables are irradiated is associated with quantified quality information having a quantified quality of leaf vegetables; a step of receiving input of the quantified quality information; and a step of controlling a displaying unit to display the light characteristic information corresponding to the quantified quality information received in the step of receiving based on the quantified quality information received in the step of receiving and the correspondence information.

Accordingly, the light characteristic information required for obtaining the input quantified quality information can be displayed based on the input quantified quality information and the correspondence information in which the light characteristic information is associated with the quantified quality information. The leaf vegetables satisfying the input quantified quality information can be obtained by irradiating the leaf vegetables with light based on the displayed light characteristic information.

The quality includes a plurality of qualities, and the step of storing stores the correspondence information for each of the plurality of qualities. Accordingly, the leaf vegetables satisfying the input quantified quality information can be obtained for each of the plurality of qualities.

A control method according to an embodiment of the present disclosure includes a step of storing correspondence information in which light characteristic information indicative of a characteristic of light with which leaf vegetables are irradiated is associated with quantified quality information having a quantified quality of leaf vegetables; a step of receiving input of the quantified quality information; and a step of outputting a signal to control a light source that irradiates the leaf vegetables with light based on the quantified quality information received in the step of receiving and the correspondence information.

Accordingly, the leaf vegetables satisfying the input quantified quality information can be obtained by controlling a light source that irradiates the leaf vegetables with light based on the input quantified quality information and the correspondence information in which the light characteristic information is associated with the quantified quality information.

The quality includes a plurality of qualities, and the step of storing stores the correspondence information for each of the plurality of qualities. Accordingly, the leaf vegetables satisfying the input quantified quality information can be obtained for each of the plurality of qualities.

An information processing apparatus 300 according to an embodiment of the present disclosure includes a storage read unit 340 that stores correspondence information in which light characteristic information indicative of a characteristic of light with which leaf vegetables are irradiated is associated with quantified quality information having a quantified quality of leaf vegetables in a storage unit 330; a receiving unit 310 that receives input of the quantified quality information; and a display controller 320 that controls a display 400, which is an example of a displaying unit, to display the light characteristic information corresponding to the quantified quality information received by the receiving unit 310 based on the quantified quality information received by the receiving unit 310 and the correspondence information.

Accordingly, the light characteristic information required for obtaining the input quantified quality information can be displayed based on the input quantified quality information and the correspondence information in which the light characteristic information is associated with the quantified quality information. The leaf vegetables satisfying the input quantified quality information can be obtained by irradiating the leaf vegetables with light based on the displayed light characteristic information.

The quality includes a plurality of qualities, and the storage read unit 340 stores the correspondence information for each of the plurality of qualities in the storage unit 330. Accordingly, the leaf vegetables satisfying the input quantified quality information can be obtained for each of the plurality of qualities.

An information processing apparatus 300, which is an example of a control apparatus, according to an embodiment of the present disclosure, includes a storage read unit 340 that stores correspondence information in which light characteristic information indicative of a characteristic of light with which leaf vegetables are irradiated is associated with quantified quality information having a quantified quality of leaf vegetables in a storage unit 330; a receiving unit 310 that receives input of the quantified quality information; and an output unit 360 that outputs a signal to control a light source that irradiates the leaf vegetables with light based on the quantified quality information received by the receiving unit 310 and the correspondence information.

Accordingly, the leaf vegetables satisfying the input quantified quality information can be obtained by controlling a light source that irradiates the leaf vegetables with light based on the input quantified quality information and the correspondence information in which the light characteristic information is associated with the quantified quality information.

The quality includes a plurality of qualities, and the storage read unit 340 stores the correspondence information for each of the plurality of qualities in the storage unit 330. Accordingly, the leaf vegetables satisfying the input quantified quality information can be obtained for each of the plurality of qualities.

In the present embodiment, the storage unit 330 stores the correspondence information in which the light characteristic information is associated with the quantified quality information in the light source control information management DB 335 including the light source control information management table. Alternatively, in another embodiment, the storage unit 330 may store a relational expression of the light characteristic information and the quantified quality information, as the correspondence information in which the light characteristic information is associated with the quantified quality information.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

In one aspect, an information processing method is provided, which includes: storing correspondence information in which light characteristic information indicative of a characteristic of light with which leaf vegetables are irradiated is associated with quantified quality information having a quantified quality of leaf vegetables; receiving input of the quantified quality information; and controlling a display to display the light characteristic information corresponding to the quantified quality information received by the receiving based on the quantified quality information received by the receiving and the correspondence information.

In one aspect, a control method is provided, which includes: storing correspondence information associating light characteristic information indicative of a characteristic of light with which leaf vegetables are irradiated, with quantified quality information having a quantified quality of leaf vegetables; receiving input of the quantified quality information; and outputting a signal to control a light source configured to irradiate the leaf vegetables with light based on the quantified quality information received by the receiving and the correspondence information.

The invention claimed is:

1. A cultivation method for cultivating leaf vegetables, the cultivation method comprising:
   preparing correspondence information associating light characteristic information indicative of a characteristic of light with which leaf vegetables are irradiated, with quantified quality information having a quantified quality of leaf vegetables;
   setting the light characteristic information; and
   irradiating the leaf vegetables with light,
   wherein the preparing includes preparing the correspondence information for at least one quality of leaf hardness, leaf thickness, leaf color, sugar content Brix value, vitamin C, and antioxidant component content of the leaf vegetables,
   the light characteristic information includes an integrated photosynthetic photon flux density of light, and
   the setting includes setting a ratio between a photosynthetic photon flux density of the red light and a photosynthetic photon flux density of the blue light and setting a range of the integrated photosynthetic photon flux density in a manner that at least one quality of the leaf hardness, the leaf thickness, the leaf color, the sugar content Brix value, the vitamin C, and the antioxidant component content is constant regardless of a value of the integrated photosynthetic photon flux density.

2. The cultivation method according to claim 1,
   wherein the quality includes a plurality of qualities, and
   wherein the preparing includes preparing the correspondence information for each of the plurality of qualities.

3. The cultivation method according to claim 2, wherein the plurality of qualities include at least two qualities of weight, height, diameter, occupancy density, leaf hardness, leaf color, taste, sugar content Brix value, and antioxidant component content of the leaf vegetables.

4. The cultivation method according to claim 1, wherein the light characteristic information includes an integrated photosynthetic photon flux density of light.

5. The cultivation method according to claim 4, wherein the integrated photosynthetic photon flux density is an integrated photosynthetic photon flux density of red light having a wavelength range from 600 nm to 700 nm.

6. The cultivation method according to claim 4, wherein the integrated photosynthetic photon flux density is an integrated photosynthetic photon flux density of blue light having a wavelength range from 400 nm to 499 nm.

7. The cultivation method according to claim 1, wherein the irradiating includes irradiating with light in a manner that an integrated photosynthetic photon flux density is 500 mol/m$^2$ or more.

8. The cultivation method according to claim 1, wherein the light characteristic information includes a ratio between photosynthetic photon flux densities of a first light and a second light having different wavelength ranges.

9. The cultivation method according to claim 8, wherein the first light is red light having a wavelength range from 600 nm to 700 nm, and the second light is blue light having a wavelength range from 400 nm to 499 nm.

10. The cultivation method according to claim 9, wherein the irradiating includes irradiating with light in a manner that a ratio between a photosynthetic photon flux density of the red light and a photosynthetic photon flux density of the blue light falls within a range from 7:1 to 1:1.

11. The cultivation method according to claim 1,
    wherein the preparing includes preparing the correspondence information for each of a plurality of qualities including at least one quality of weight, height, and diameter of the leaf vegetables and at least one quality of the leaf hardness, the leaf thickness, the leaf color, the sugar content Brix value, the vitamin C, and the antioxidant component content, and
    wherein the setting includes changing the integrated photosynthetic photon flux density to keep the leaf hardness, the leaf thickness, the leaf color, the sugar content Brix value, the vitamin C, or the antioxidant component content constant and to change a value of the weight, the height, or the diameter.

12. The cultivation method according to claim 1,
    wherein the irradiating is executed in a seeding stage and a cultivation stage after the seeding stage, and
    wherein the cultivation method further comprises increasing a plant interval between the leaf vegetables in the cultivation stage to be 9 times or less the plant interval between the leaf vegetables in the seeding stage.

13. The cultivation method according to claim 1, wherein the irradiating is executed in a seeding stage, a plant interval between the leaf vegetables in the seeding stage being 30 mm or less.

14. An information processing apparatus comprising:
circuitry configured to:
- store, in a memory, correspondence information associating light characteristic information indicative of a characteristic of light with which leaf vegetables are irradiated, with quantified quality information having a quantified quality of leaf vegetables;
- receive input of the quantified quality information;
- control a display to display the light characteristic information corresponding to the received quantified quality information based on the received quantified quality information and the correspondence information; and
- output a signal to control a light source to irradiate the leaf vegetables with light based on the displayed light characteristic information, wherein the stored correspondence information includes correspondence information for at least one quality of leaf hardness, leaf thickness, leaf color, sugar content Brix value, vitamin C, and antioxidant component content of the leaf vegetables, the light characteristic information includes an integrated photosynthetic photon flux density of light, and the setting includes setting a ratio between a photosynthetic photon flux density of the red light and a photosynthetic photon flux density of the blue light and setting a range of the integrated photosynthetic photon flux density in a manner that at least one quality of the leaf hardness, the leaf thickness, the leaf color, the sugar content Brix value, the vitamin C, and the antioxidant component content is constant regardless of a value of the integrated photosynthetic photon flux density.

15. A control apparatus comprising:
circuitry configured to:
- store, in a memory, correspondence information associating light characteristic information indicative of a characteristic of light with which leaf vegetables are irradiated, with quantified quality information having a quantified quality of leaf vegetables;
- receive input of the quantified quality information; and
- output a signal to control a light source to irradiate the leaf vegetables with light based on the received quantified quality information and the correspondence information, wherein the stored correspondence information includes correspondence information for at least one quality of leaf hardness, leaf thickness, leaf color, sugar content Brix value, vitamin C, and antioxidant component content of the leaf vegetables, the light characteristic information includes an integrated photosynthetic photon flux density of light, and the setting includes setting a ratio between a photosynthetic photon flux density of the red light and a photosynthetic photon flux density of the blue light and setting a range of the integrated photosynthetic photon flux density in a manner that at least one quality of the leaf hardness, the leaf thickness, the leaf color, the sugar content Brix value, the vitamin C, and the antioxidant component content is constant regardless of a value of the integrated photosynthetic photon flux density.

* * * * *